US012775702B2

(12) United States Patent
Duan et al.

(10) Patent No.: US 12,775,702 B2

(45) Date of Patent: Oct. 27, 2026

(54) POSITIONING REFERENCE SIGNAL ATTACK DETECTION IN A WIRELESS COMMUNICATION NETWORK

(71) Applicant: QUALCOMM Incorporated, San Diego, CA (US)

(72) Inventors: Weimin Duan, San Diego, CA (US); Alexandros Manolakos, Escondido, CA (US); Soo Bum Lee, San Diego, CA (US); Aziz Gholmieh, Del Mar, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 18/263,115

(22) PCT Filed: Jan. 26, 2022

(86) PCT No.: PCT/US2022/070366
§ 371 (c)(1),
(2) Date: Jul. 26, 2023

(87) PCT Pub. No.: WO2022/217168
PCT Pub. Date: Oct. 13, 2022

(65) Prior Publication Data

US 2024/0104202 A1 Mar. 28, 2024

(30) Foreign Application Priority Data

Apr. 7, 2021 (GR) .............................. 20210100239

(51) Int. Cl.

| | |
|---|---|
| ***G06F 21/55*** | (2013.01) |
| ***G01S 5/02*** | (2010.01) |
| ***H04L 5/00*** | (2006.01) |

(52) U.S. Cl.
CPC .......... *G06F 21/554* (2013.01); *G01S 5/0215* (2013.01); *H04L 5/0051* (2013.01)

(58) Field of Classification Search
CPC ... H04L 27/2602; H04L 5/0007; H04L 27/26; H04L 5/00; G06F 21/55; G01S 5/02; G04L 5/00
See application file for complete search history.

(56) References Cited

U.S. PATENT DOCUMENTS 10,313,838 B2 6/2019 Sampath et al.
11,758,538 B2 9/2023 Takeda et al.
(Continued)

FOREIGN PATENT DOCUMENTS

CN 112162301 A 1/2021
EP 3379295 A1 9/2018
(Continued)

OTHER PUBLICATIONS

International Search Report and Written Opinion—PCT/US2022/070365—ISA/EPO—May 13, 2022.
(Continued)

*Primary Examiner* — Iqbal Zaidi
(74) *Attorney, Agent, or Firm* — Weaver Austin Villeneuve & Sampson LLP

(57) ABSTRACT

Man-in-the-middle attacks on reference signals used for positioning a mobile device in a wireless network can be detected through time and/or angle consistency checks. Time consistency checks may be based on a consistency of peak location and/or power delay profile across multiple reference signals and/or across different signal types, for example. Angle consistency checks may be based on a consistency of an angle at which a reference signal is received across multiple reference signals and/or in com-
(Continued)

parison with an expected angle, for example. Embodiments may further include reporting detected attacks.

30 Claims, 18 Drawing Sheets

(56) References Cited

U.S. PATENT DOCUMENTS

| | | | |
|---|---|---|---|
| 12,156,171 B2 * | 11/2024 | Ren | H04L 5/0048 |
| 2013/0301452 A1 | 11/2013 | Yoon | |
| 2014/0171111 A1 | 6/2014 | Xiao et al. | |
| 2018/0007576 A1 | 1/2018 | Lee et al. | |
| 2018/0048444 A1 | 2/2018 | Park et al. | |
| 2018/0139763 A1 | 5/2018 | Bitra et al. | |
| 2019/0061693 A1 | 2/2019 | Johnson | |
| 2019/0319827 A1 | 10/2019 | Opshaug et al. | |
| 2019/0372818 A1 | 12/2019 | Williams et al. | |
| 2020/0182959 A1 * | 6/2020 | Markhovsky | G01S 19/05 |
| 2020/0196298 A1 | 6/2020 | Edge et al. | |
| 2022/0099842 A1 | 3/2022 | Cao et al. | |
| 2023/0176174 A1 * | 6/2023 | Penna | H01Q 3/46 342/451 |
| 2024/0063974 A1 | 2/2024 | Manolakos et al. | |

FOREIGN PATENT DOCUMENTS

| | | | |
|---|---|---|---|
| TW | 202033028 | A | 9/2020 |
| WO | WO-2020001533 | A1 | 1/2020 |
| WO | 2020167057 | A1 | 8/2020 |

OTHER PUBLICATIONS

International Search Report and Written Opinion—PCT/US2022/070366—ISA/EPO—May 6, 2022.

* cited by examiner

POSITIONING REFERENCE SIGNAL ATTACK DETECTION IN A WIRELESS COMMUNICATION NETWORK

RELATED APPLICATIONS

This application is a National Phase entry of International Application No. PCT/US22/70366, filed Jan. 26, 2022, entitled "POSITIONING REFERENCE SIGNAL ATTACK DETECTION IN A WIRELESS COMMUNICATION NETWORK" which claims the benefit of Greek Application No. 20210100239, filed Mar. 7, 2021, entitled "POSITIONING REFERENCE SIGNAL ATTACK DETECTION IN A WIRELESS COMMUNICATION NETWORK", both of which are assigned to the assignee hereof, and incorporated herein in their entirety by reference.

BACKGROUND

1. Field of Invention

The present invention relates generally to the field of wireless communications, and more specifically to determining the location of a User Equipment (UE) using radio frequency (RF) signals.

2. Description of Related Art

In a wireless communication network such as a 5th Generation (5G) New Radio (NR) or other cellular network, a location estimation of a user equipment (UE) (a mobile device within the network) may be determined by the UE transmitting and/or measuring reference signals. Although these reference signals are encoded, they may be vulnerable to an attacker that decodes a first portion of a reference signal and mimics a subsequent portion or repetition of the reference signal. Such attacks can decrease the accuracy of the location estimation, which can reduce the value of providing location estimation itself.

BRIEF SUMMARY

Embodiments herein address these and other issues by detecting attacks through time and/or angle consistency checks. Time consistency checks may be based on a consistency of peak location and/or power delay profile across multiple reference signals and/or across different signal types, for example. Angle consistency checks may be based on a consistency of an angle at which a reference signal is received across multiple reference signals and/or in comparison with an expected angle, for example. Embodiments may further include reporting detected attacks.

An example method of detecting an attack on reference signals used for positioning of a user equipment (UE) in a wireless communication network, according to this description, includes receiving, at the receiving device, at least a portion of a reference signal resource transmitted by a transmitting device determining a measured signal characteristic from an Orthogonal Frequency Division Multiplexing (OFDM) symbol of the at least a portion of the reference signal resource, a resource repetition of the at least a portion of the reference signal resource, or a combination thereof. The method also comprises comparing the measured signal characteristic with a comparison signal characteristic, wherein the comparison signal characteristic comprises: a calculated angle based on estimated locations of the transmitting device and receiving device, or a corresponding measured signal characteristic of one or more radio frequency (RF) signals transmitted by the transmitting device. The method also comprises responsive to determining greater than a threshold difference between the measured signal characteristic and the comparison signal characteristic, sending information indicative of an attack on the reference signal resource to another device.

An example receiving device for detecting an attack on reference signals used for positioning of a user equipment (UE) in a wireless communication network, according to this description, includes a transceiver, a memory, and one or more processing units communicatively coupled with the transceiver and the memory. The one or more processing units configured to receive, via the transceiver, at least a portion of a reference signal resource transmitted by a transmitting device. The one or more processing units are further configured to determine a measured signal characteristic from: an Orthogonal Frequency Division Multiplexing (OFDM) symbol of the at least a portion of the reference signal resource, a resource repetition of the at least a portion of the reference signal resource, or a combination thereof. The one or more processing units are further configured to compare the measured signal characteristic with a comparison signal characteristic, wherein the comparison signal characteristic comprises: a calculated angle based on estimated locations of the transmitting device and receiving device, or a corresponding measured signal characteristic of one or more radio frequency (RF) signals transmitted by the transmitting device. The one or more processing units are further configured to responsive to determining greater than a threshold difference between the measured signal characteristic and the comparison signal characteristic, send information indicative of an attack on the reference signal resource to another device via the transceiver.

Another example device for detecting an attack on reference signals used for positioning of a user equipment (UE) in a wireless communication network, according to this description, includes means for receiving at least a portion of a reference signal resource transmitted by a transmitting device. The device further comprises means for determining a measured signal characteristic from: an Orthogonal Frequency Division Multiplexing (OFDM) symbol of the at least a portion of the reference signal resource, a resource repetition of the at least a portion of the reference signal resource, or a combination thereof. The device further comprises means for comparing the measured signal characteristic with a comparison signal characteristic, wherein the comparison signal characteristic comprises: a calculated angle based on estimated locations of the transmitting device and a receiving device, or a corresponding measured signal characteristic of one or more radio frequency (RF) signals transmitted by the transmitting device. The device further comprises means for sending, responsive to determining greater than a threshold difference between the measured signal characteristic and the comparison signal characteristic, information indicative of an attack on the reference signal resource to another device.

An example non-transitory computer-readable medium, according to this description, stores instructions for detecting an attack on reference signals used for positioning of a user equipment (UE) in a wireless communication network. The instructions comprises code for receiving, at a receiving device, at least a portion of a reference signal resource transmitted by a transmitting device. The instructions further comprise code for determining a measured signal characteristic from: an Orthogonal Frequency Division Multiplexing (OFDM) symbol of the at least a portion of the reference signal resource, a resource repetition of the at least a portion of the reference signal resource, or a combination thereof. The instructions further comprise code for comparing the measured signal characteristic with a comparison signal characteristic, wherein the comparison signal characteristic comprises: a calculated angle based on estimated locations of the transmitting device and receiving device, or a corresponding measured signal characteristic of one or more radio frequency (RF) signals transmitted by the transmitting device. The instructions further comprise code for, responsive to determining greater than a threshold difference between the measured signal characteristic and the comparison signal characteristic, sending information indicative of an attack on the reference signal resource to another device.

BRIEF DESCRIPTION OF THE DRAWINGS

Like reference symbols in the various drawings indicate like elements, in accordance with certain example implementations.

Figure 1:
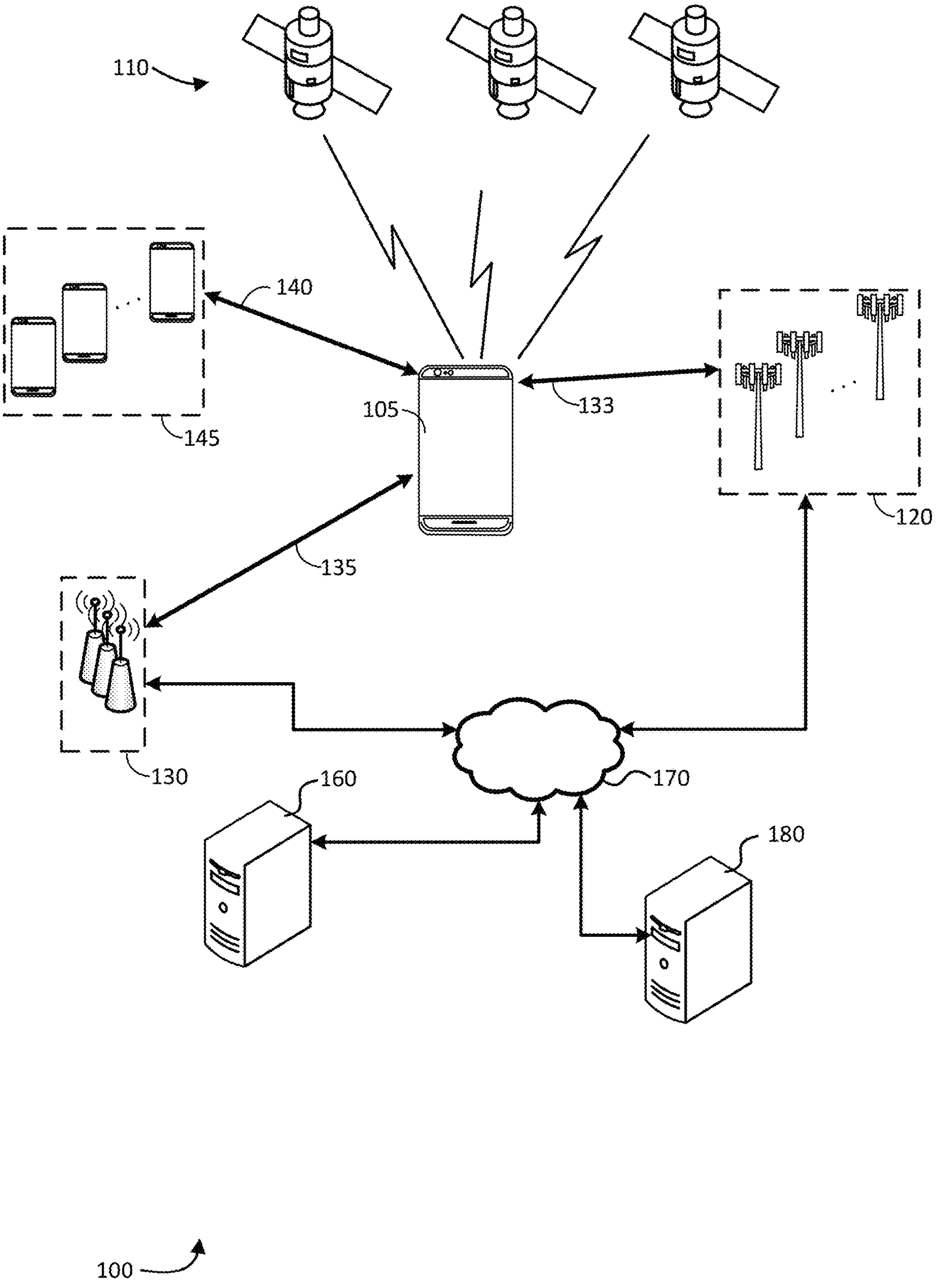
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

In a wireless communication network such as a 5th Generation (5G) New Radio (NR) or other cellular network, a location estimation of a UE (a mobile device within the network) may be determined by the UE transmitting and/or measuring reference signals. Although these reference signals are encoded, they may be vulnerable to an attacker that decodes a first portion of a reference signal and mimics a subsequent portion or repetition of the reference signal. Embodiments described herein provide for detecting such attacks through time and/or angle consistency checks. Detected attacks can be reported to help mitigate positioning inaccuracies and/or other issues arising from the attacks. A detailed description of these embodiments is provided after a description of systems and technologies related to these embodiments.

FIG. 1 is a simplified illustration of a positioning system 100 in which a UE 120, location server 160, and/or other components of the positioning system 100 can use the techniques provided herein for positioning reference signal attack detection in a wireless communication network, according to an embodiment. The techniques described herein may be implemented by one or more components of the positioning system 100. The positioning system 100 can include: a UE 120; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 120 based on RF signals received by and/or sent from the UE 120 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 120 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 120 can send and receive information with network-connected devices, such as location server 160, by accessing the network 170 via a base station 120 using a first communication link 133. Additionally or alternatively, because APs 130 also may be communicatively coupled with the network 170, UE 120 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 120 and/or provide data (e.g., "assistance data") to UE 120 to facilitate location measurement and/or location determination by UE 120. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 120 based on subscription information for UE 120 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 120 using a control plane (CP) location solution for LTE radio access by UE 120. The location server 160 may further comprise a Location Management Function (LNIF) that supports location of UE 120 using a control plane (CP) location solution for NR or LTE radio access by UE 120.

In a CP location solution, signaling to control and manage the location of UE 120 may be exchanged between elements of network 170 and with UE 120 using existing network interfaces and protocols and as signaling from the perspective of network 170. In a UP location solution, signaling to control and manage the location of UE 120 may be exchanged between location server 160 and UE 120 as data (e.g. data transported using the Internet Protocol (IP) and/or Transmission Control Protocol (TCP)) from the perspective of network 170.

As previously noted (and discussed in more detail below), the estimated location of UE 120 may be based on measurements of RF signals sent from and/or received by the UE 120. In particular, these measurements can provide information regarding the relative distance and/or angle of the UE 120 from one or more components in the positioning system 100 (e.g., GNSS satellites 110, APs 130, base stations 120). The estimated location of the UE 120 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 120 may be estimated at least in part based on measurements of RF signals 140 communicated between the UE 120 and one or more other UEs 145, which may be mobile or fixed. When or more other UEs 145 are used in the position determination of a particular UE 120, the UE 120 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 120 may comprise sidelink and/or similar Device-to-Device (D2D) communication technologies. Sidelink, which is defined by 3GPP, is a form of D2D communication under the cellular-based LTE and NR standards.

An estimated location of UE 120 can be used in a variety of applications—e.g. to assist direction finding or navigation for a user of UE 120 or to assist another user (e.g. associated with external client 180) to locate UE 120. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 120 may comprise an absolute location of UE 120 (e.g. a latitude and longitude and possibly altitude) or a relative location of UE 120 (e.g. a location expressed as distances north or south, east or west and possibly above or below some other known fixed location or some other location such as a location for UE 120 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 120 is expected to be located with some level of confidence (e.g. 95% confidence).

The external client 180 may be a web server or remote application that may have some association with UE 120 (e.g. may be accessed by a user of UE 120) or may be a server, application, or computer system providing a location service to some other user or users which may include obtaining and providing the location of UE 120 (e.g. to enable a service such as friend or relative finder, asset tracking or child or pet location). Additionally or alternatively, the external client 180 may obtain and provide the location of UE 120 to an emergency services provider, government agency, etc.

Figure 2:
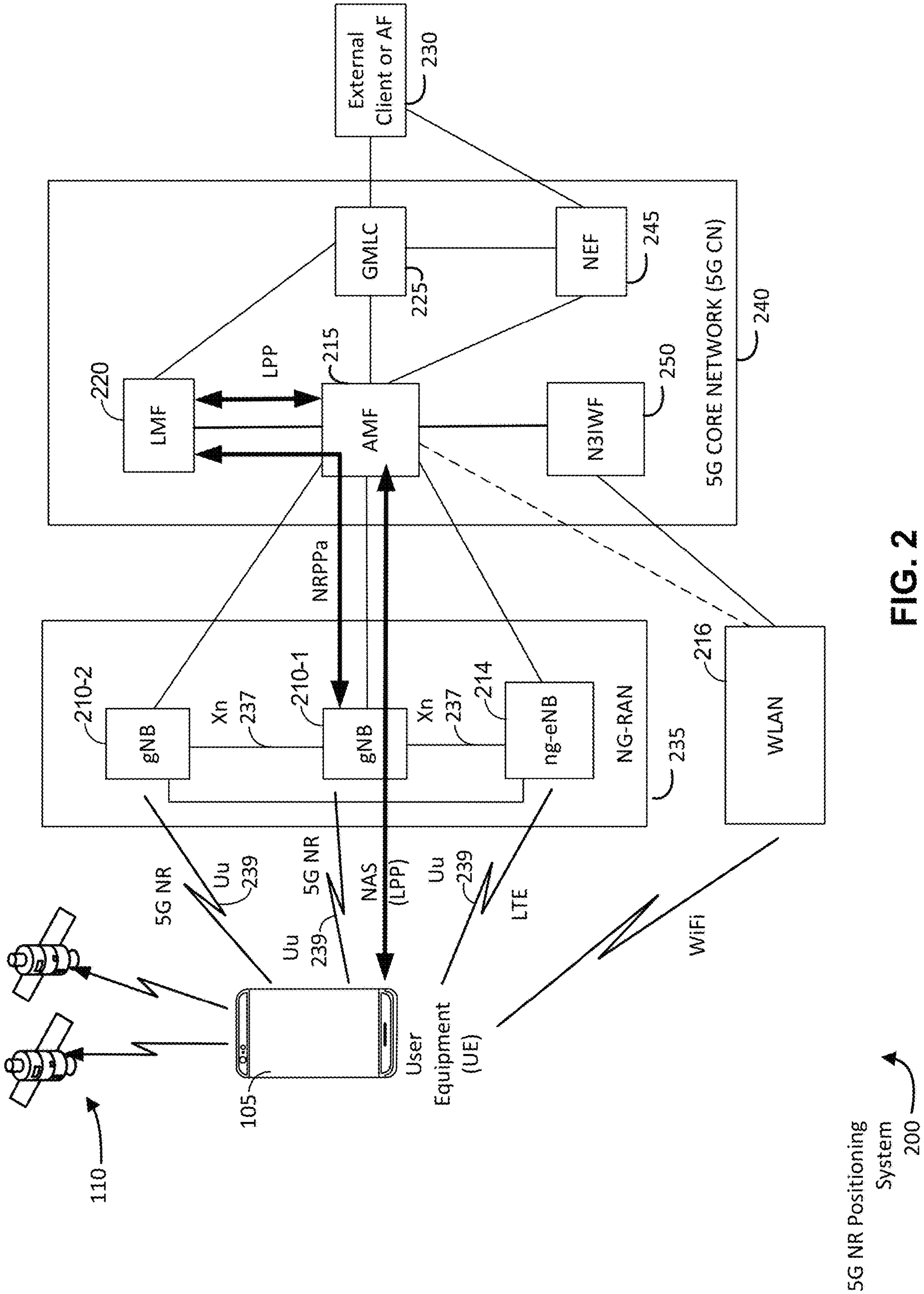
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 120 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 120, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 120 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 120 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 120 may correspond to a cellphone, smartphone, laptop, tablet, personal data assistant (PDA), tracking device, navigation device, Internet of Things (IoT) device, or some other portable or moveable device. Typically, though not necessarily, the UE 120 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 120 may also support wireless communication using a WLAN 216 which (like the one or more RATs, and as previously noted with respect to FIG. 1) may connect to other networks, such as the Internet. The use of one or more of these RATs may allow the UE 120 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 120 (e.g., via the GMLC 225). The external client 230 of FIG. 2 may correspond to external client 180 of FIG. 1, as implemented in or communicatively coupled with a 5G NR network.

The UE 120 may include a single entity or may include multiple entities, such as in a personal area network where a user may employ audio, video and/or data I/O devices, and/or body sensors and a separate wireline or wireless modem. An estimate of a location of the UE 120 may be referred to as a location, location estimate, location fix, fix, position, position estimate, or position fix, and may be geodetic, thus providing location coordinates for the UE 120 (e.g., latitude and longitude), which may or may not include an altitude component (e.g., height above sea level, height above or depth below ground level, floor level or basement level). Alternatively, a location of the UE 120 may be expressed as a civic location (e.g., as a postal address or the designation of some point or small area in a building such as a particular room or floor). A location of the UE 120 may also be expressed as an area or volume (defined either geodetically or in civic form) within which the UE 120 is expected to be located with some probability or confidence level (e.g., 67%, 95%, etc.). A location of the UE 120 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 120 via wireless communication between the UE 120 and one or more of the gNBs 210, which may provide wireless communications access to the 5G CN 240 on behalf of the UE 120 using 5G NR. The wireless interface between base stations (gNBs 210 and/or ng-eNB 214) and the UE 120 may be referred to as a Uu interface 239. 5G NR radio access may also be referred to as NR radio access or as 5G radio access. In FIG. 2, the serving gNB for UE 120 is assumed to be gNB 210-1, although other gNBs (e.g. gNB 210-2) may act as a serving gNB if UE 120 moves to another location or may act as a secondary gNB to provide additional throughput and bandwidth to UE 120.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 120. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 120 but may not receive signals from UE 120 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 120 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 120 to other elements in 5G CN 240 and/or may support interworking of one or more protocols used by WLAN 216 and UE 120 to one or more protocols used by other elements of 5G CN 240 such as AMF 215. For example, N3IWF 250 may support IPSec tunnel establishment with UE 120, termination of IKEv2/IPSec protocols with UE 120, termination of N2 and N3 interfaces to 5G CN 240 for control plane and user plane, respectively, relaying of uplink (UL) and downlink (DL) control plane Non-Access Stratum (NAS) signaling between UE 120 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 120 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 120) and/or obtain downlink (DL) location measurements from the UE 120 that were obtained by UE 120 for DL signals received by UE 120 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 120, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 120 may be applicable to such other networks.

The gNBs 210 and ng-eNB 214 can communicate with an AMF 215, which, for positioning functionality, communicates with an LMF 220. The AMF 215 may support mobility of the UE 120, including cell change and handover of UE 120 from an access node 210, 214, or 216 of a first RAT to an access node 210, 214, or 216 of a second RAT. The AMF 215 may also participate in supporting a signaling connection to the UE 120 and possibly data and voice bearers for the UE 120. The LMF 220 may support positioning of the UE 120 using a CP location solution when UE 120 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 120, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 120's location) may be performed at the UE 120 (e.g., by measuring downlink PRS (DL-PRS) signals transmitted by wireless nodes such as gNBs 210, ng-eNB 214 and/or WLAN 216, and/or using assistance data provided to the UE 120, e.g., by LMF 220).

The Gateway Mobile Location Center (GMLC) 225 may support a location request for the UE 120 received from an external client 230 and may forward such a location request to the AMF 215 for forwarding by the AMF 215 to the LMF 220. A location response from the LMF 220 (e.g., containing a location estimate for the UE 120) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 120 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 120 and providing the location to external client 230.

As further illustrated in FIG. 2, the LMF 220 may communicate with the gNBs 210 and/or with the ng-eNB 214 using an NR Positioning Protocol A (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 120 may communicate using an LTE Positioning Protocol (LPP) as defined in 3GPP TS 37.355. Here, LPP messages may be transferred between the UE 120 and the LMF 220 via the AMF 215 and a serving gNB 210-1 or serving ng-eNB 214 for UE 120. For example, LPP messages may be transferred between the LMF 220 and the AMF 215 using messages for service-based operations (e.g., based on the Hypertext Transfer Protocol (HTTP)) and may be transferred between the AMF 215 and the UE 120 using a 5G NAS protocol. The LPP protocol may be used to support positioning of UE 120 using UE assisted and/or UE based position methods such as A-GNSS, RTK, TDOA, multi-cell RTT, AoD, and/or ECID. The NRPPa protocol may be used to support positioning of UE 120 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 120 access to WLAN 216, LMF 220 may use NRPPa and/or LPP to obtain a location of UE 120 in a similar manner to that just described for UE 120 access to a gNB 210 or ng-eNB 214. Thus, NRPPa messages may be transferred between a WLAN 216 and the LMF 220, via the AMF 215 and N3IWF 250 to support network-based positioning of UE 120 and/or transfer of other location information from WLAN 216 to LMF 220. Alternatively, NRPPa messages may be transferred between N3IWF 250 and the LMF 220, via the AMF 215, to support network-based positioning of UE 120 based on location related information and/or location measurements known to or accessible to N3IWF 250 and transferred from N3IWF 250 to LMF 220 using NRPPa. Similarly, LPP and/or LPP messages may be transferred between the UE 120 and the LMF 220 via the AMF 215, N3IWF 250, and serving WLAN 216 for UE 120 to support UE assisted or UE based positioning of UE 120 by LMF 220.

In a 5G NR positioning system 200, positioning methods can be categorized as being "UE assisted" or "UE based." This may depend on where the request for determining the position of the UE 120 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 120 may obtain location measurements and send the measurements to a location server (e.g., LMF 220) for computation of a location estimate for UE 120. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (ToA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 120 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 120 may obtain location measurements (e.g., which may be the same as or similar to location measurements for a UE assisted position method) and may further compute a location of UE 120 (e.g., with the help of assistance data received from a location server such as LMF 220, an SLP, or broadcast by gNBs 210, ng-eNB 214, or WLAN 216).

With a network based position method, one or more base TRPs (e.g., base stations gNBs 210 and/or ng-eNB 214), one or more APs (e.g., in WLAN 216), or N3IWF 250 may obtain location measurements (e.g., measurements of RSSI, RTT, RSRP, RSRQ, AoA, or ToA) for signals transmitted by UE 120, and/or may receive measurements obtained by UE 120 or by an AP in WLAN 216 in the case of N3IWF 250, and may send the measurements to a location server (e.g., LMF 220) for computation of a location estimate for UE 120.

Positioning of the UE 120 also may be categorized as UL, DL, or DL-UL based, depending on the types of signals used for positioning. If, for example, positioning is based solely on signals received at the UE 120 (e.g., from a TRP or other UE), the positioning may be categorized as DL based. On the other hand, if positioning is based solely on signals transmitted by the UE 120 (which may be received by a TRP or other UE, for example), the positioning may be categorized as UL based. Positioning that is DL-UL based includes positioning, such as RTT-based positioning, that is based on signals that are both transmitted and received by the UE 120. Sidelink (SL)-assisted positioning comprises signals communicated between the UE 120 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by TRPs or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
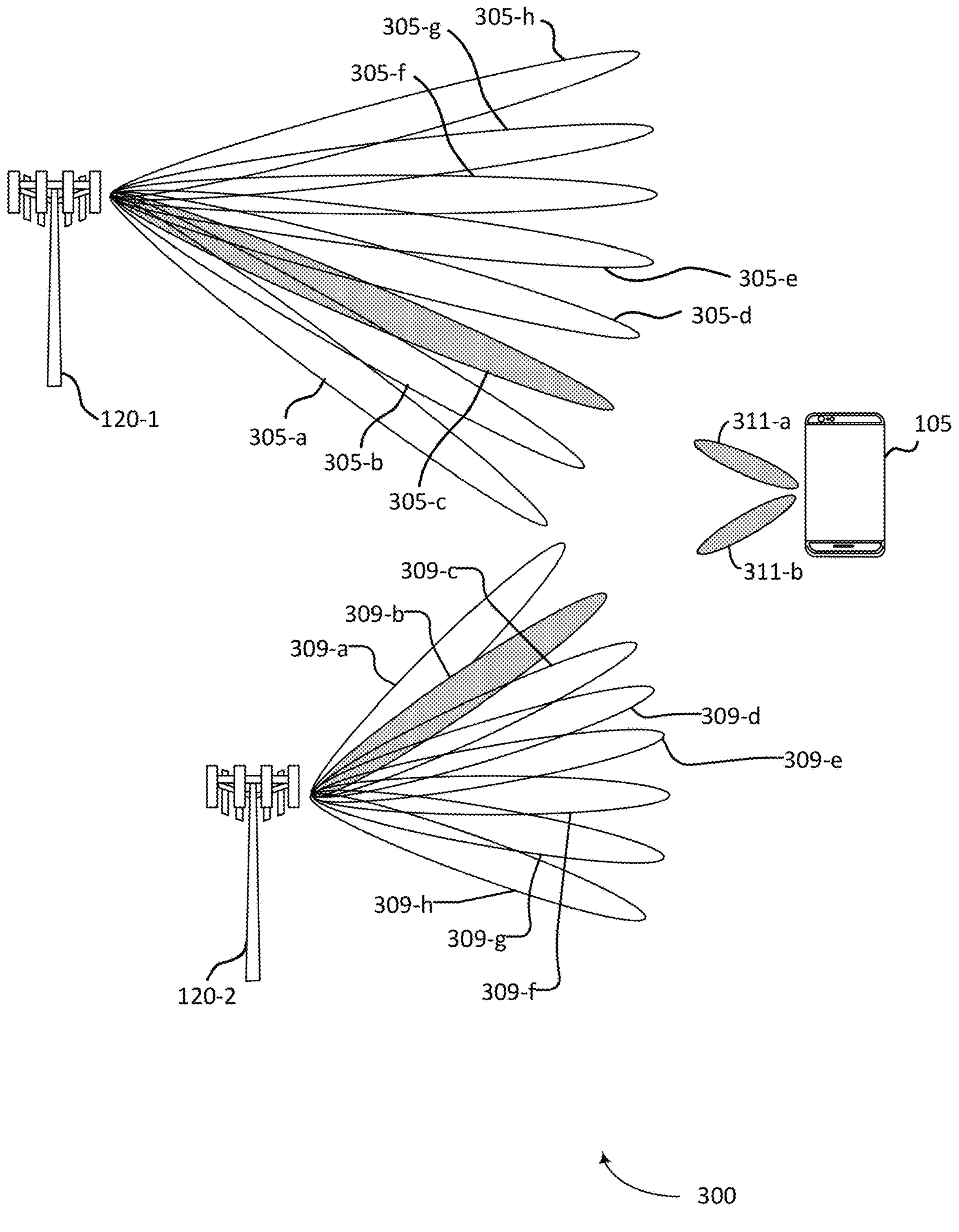
FIG. 3 is a diagram illustrating an example of beamforming that can be used by difference devices to perform Angle of Arrival (AoA) and/or Angle of Departure (AoD) measurements, as described herein.

FIG. 3 is a diagram illustrating a simplified environment 300 including two base stations (or TRPs) 120-1 and 120-2 (which may correspond to base stations 120 of FIG. 1 and/or gNBs 210 and/or ng-eNB 214 of FIG. 2) producing directional beams for transmitting RF reference signals, and a UE 120. Such directional beams are used in 5G NR wireless communication networks. Each of the directional beams is rotated, e.g., through 120 or 360 degrees, for each beam sweep, which may be periodically repeated. Each direction beam can include an RF reference signal (e.g., a PRS resource), where base station 120-1 produces a set of RF reference signals that includes Tx beams 305-*a*, 305-*b*, 305-*c*, 305-*d*, 305-*e*, 305-*f*, 305-*g*, and 305-*h*, and the base station 120-2 produces a set of RF reference signals that includes Tx beams 309-*a*, 309-*b*, 309-*c*, 309-*d*, 309-*e*, 309-*f*, 309-*g*, and 309-*h*. Because UE 120 may also include an antenna array, it can receive RF reference signals transmitted by base stations 120-1 and 120-2 using beamforming to form respective receive beams (Rx beams) 311-*a* and 311-*b*. Beamforming in this manner (by base stations 120 and optionally by UEs 105) can be used to make communications more efficient. They can also be used for other purposes, including taking AoD and AoA measurements for position determination. As the previously mentioned and described in further detail below, embodiments may use AoA measurements to determine positioning reference signal attacks.

Figure 4:
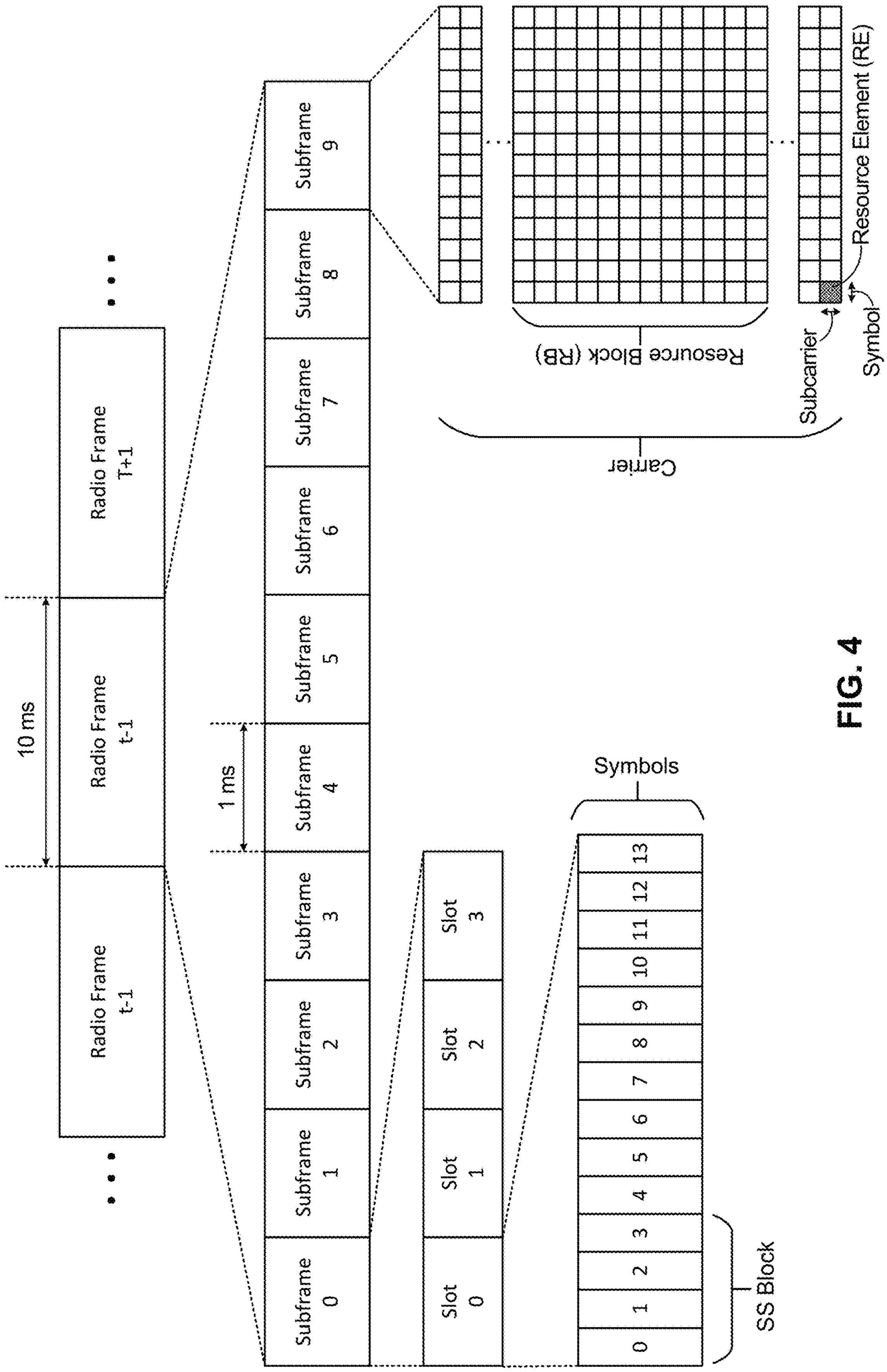
FIG. 4 is a diagram showing an example of a frame structure for NR and associated terminology.

FIG. 4 is a diagram showing an example of a frame structure for NR and associated terminology, which can serve as the basis for physical layer communication between the UE 120 and base stations, such as serving gNB 210-1. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 4 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 4. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 5:
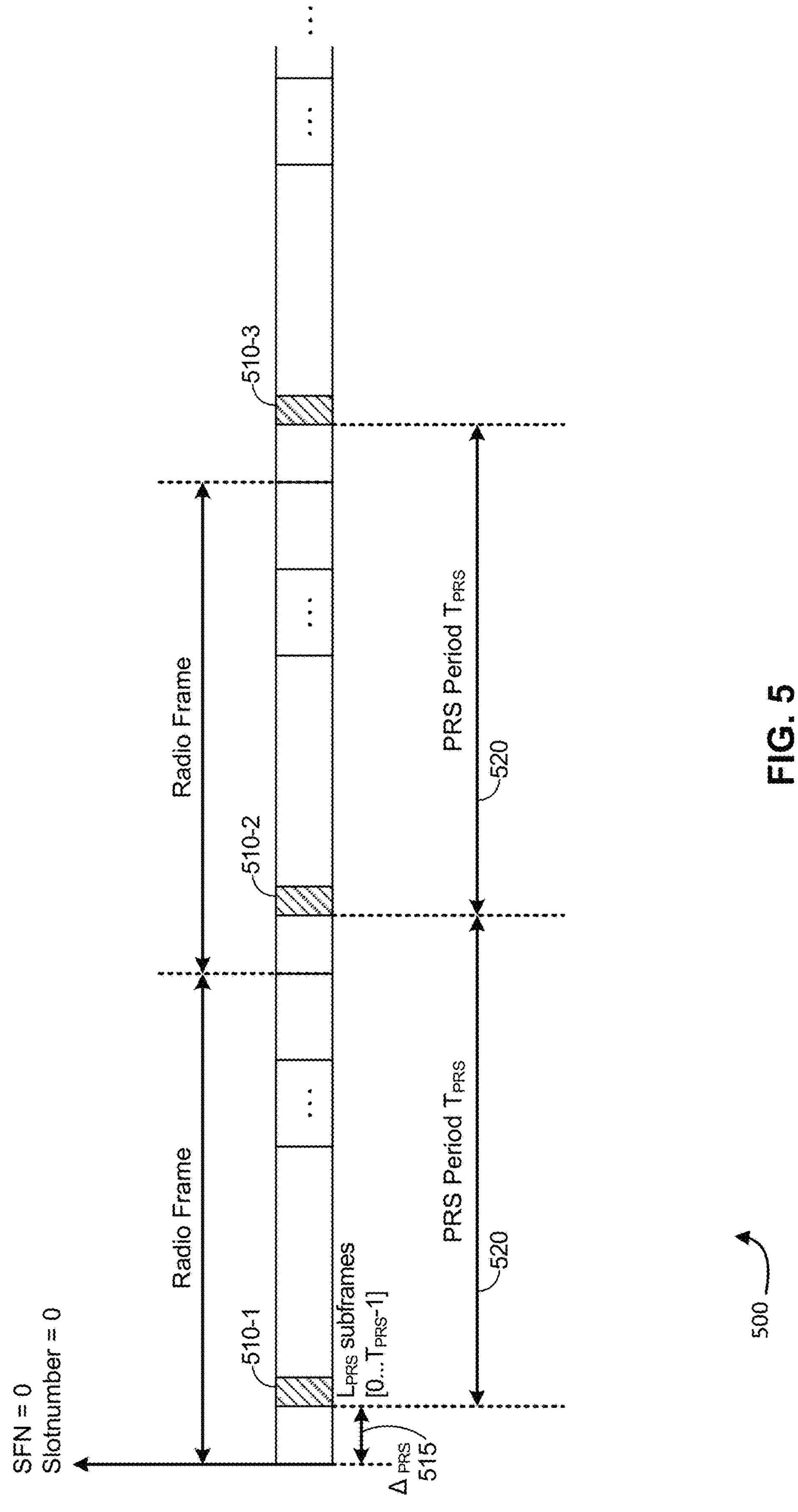
FIG. 5 is a diagram showing an example of a radio frame sequence with Positioning Reference Signal (PRS) positioning occasions, according to an embodiment.

FIG. 5 is a diagram showing an example of a radio frame sequence 500 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition." Subframe sequence 500 may be applicable to broadcast of PRS signals (DL-PRS signals) from base stations 120 in positioning system 100. The radio frame sequence 500 may be used in 5G NR (e.g., in 5G NR positioning system 200) and/or in LTE. Similar to FIG. 4, time is represented horizontally (e.g., on an X axis) in FIG. 5, with time increasing from left to right. Frequency is represented vertically (e.g., on a Y axis) with frequency increasing (or decreasing) from bottom to top.

FIG. 5 shows how PRS positioning occasions 510-1, 510-2, and 510-3 (collectively and generically referred to herein as positioning occasions 510) are determined by a System Frame Number (SFN), a cell-specific subframe offset (APRs) 515, a length or span of $L_{PRS}$ subframes, and the PRS Periodicity ($T_{PRS}$) 520. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset ($\Delta_{PRS}$) 515 may be defined in terms of the number of subframes transmitted starting from System Frame Number (SFN) 0 to the start of the first (subsequent) PRS positioning occasion.

A PRS may be transmitted by wireless nodes (e.g., TRPs) after appropriate configuration (e.g., by an Operations and Maintenance (O&M) server). A PRS may be transmitted in special positioning subframes or slots that are grouped into positioning occasions 510. For example, a PRS positioning occasion 510-1 can comprise a number NPRS of consecutive positioning subframes where the number NPRS may be between 1 and 160 (e.g., may include the values 1, 2, 4 and 6 as well as other values). PRS occasions 510 may be grouped into one or more PRS occasion groups. As noted, PRS positioning occasions 510 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some aspects, $T_{PRS}$ may be measured in terms of the number of subframes between the start of consecutive positioning occasions.

In some aspects, when a UE 120 receives a PRS configuration index $I_{PRS}$ in the assistance data for a particular cell (e.g., TRP), the UE 120 may determine the PRS periodicity $T_{PRS}$ 520 and cell-specific subframe offset ($\Delta_{PRS}$) 515 using stored indexed data. The UE 120 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 515) relative to other cells in the network that use a different frequency. In SFN-synchronous networks all wireless nodes (e.g., TRPs/base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 120 may determine the timing of the PRS occasions 510 of the reference and neighbor cells for TDOA positioning, if the UE 120 can obtain the cell timing (e.g., SFN or Frame Number) of at least one of the cells, e.g., the reference cell or a serving cell. The timing of the other cells may then be derived by the UE 120 based, for example, on the assumption that PRS occasions from different cells overlap.

With reference to the frame structure in FIG. 4, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular comb size (also referred to as the "comb density"). A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 6.

A "PRS resource set" is a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set may have the same periodicity, a common muting pattern configuration, and the same repetition factor across slots. The periodicity may have a length selected from $2^{m}\cdot\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (e.g., 210, 214, 216) may transmit frames, or other physical layer signaling sequences, supporting PRS signals (i.e. a DL-PRS) according to frame configurations as previously described, which may be measured and used for position determination of the UE 120. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

Figure 7:
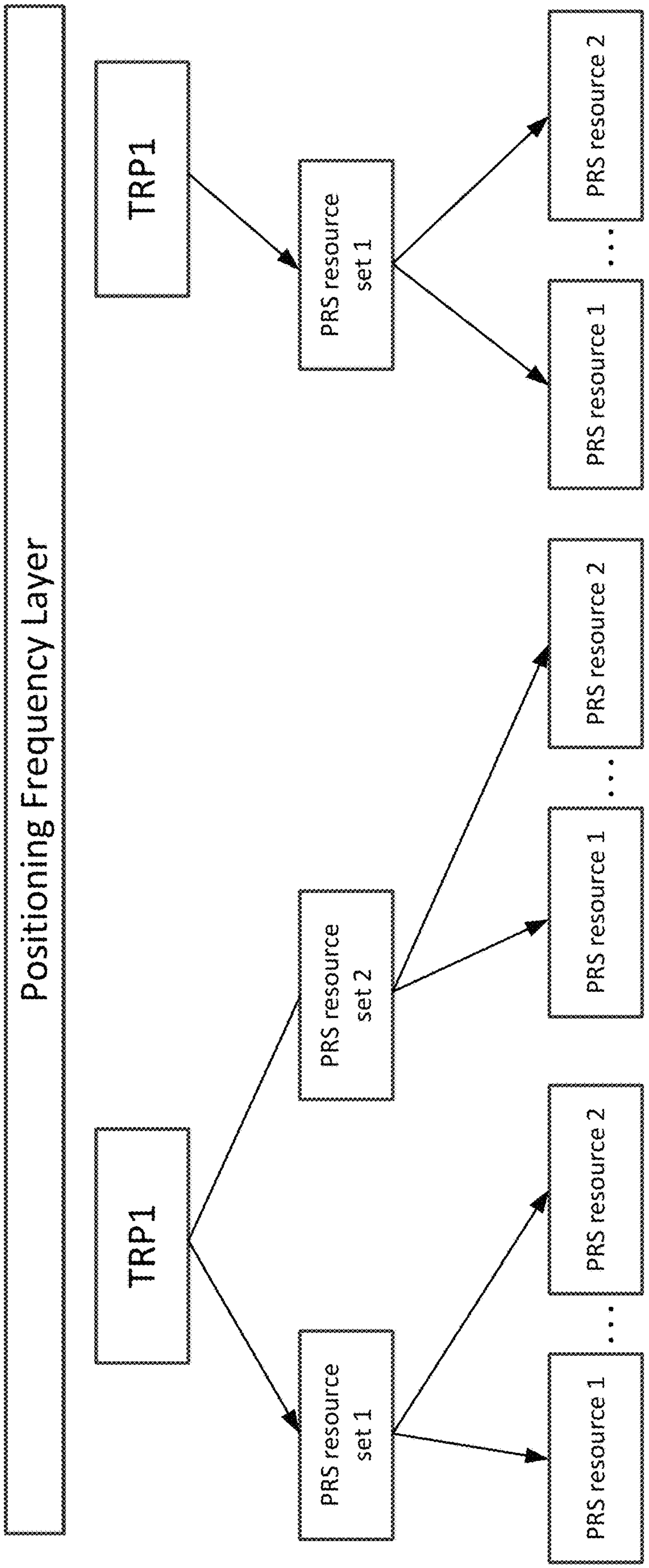
FIG. 7 is a diagram of an example hierarchical structure of reference signal recourses that can be used for positioning, according to an embodiment.

FIG. 7 is a diagram of a hierarchical structure of how PRS resources and PRS resource sets may be used by different TRPs of a given position frequency layer (PFL), as defined in 5G NR. With respect to a network (Uu) interface, a UE 120 can be configured with one or more DL-PRS resource sets from each of one or more TRPs. Each DL-PRS resource set includes K≥1 DL-PRS resource(s), which, as previously noted, may correspond to a Tx beam of the TRP. A DL-PRS PFL is defined as a collection of DL-PRS resource sets which have the same subcarrier spacing (SCS) and cyclic prefix (CP) type, the same value of DL-PRS bandwidth, the same center frequency, and the same value of comb size. In current iterations of the NR standard, a UE 120 can be configured with up to four DL-PRS PFLs.

NR has multiple frequency bands across different frequency ranges (e.g., Frequency Range 1 (FR1) and Frequency Range 2 (FR2)). PFLs may be on the same band or different bands. In some embodiments, they may even be in different frequency ranges. Additionally, as illustrated in FIG. 7, multiple TRPs (e.g., TRP1 and TR2) may be on the same PFL. Currently under NR, each TRP can have up to two PRS resource sets, each with one or more PRS resources, as previously described.

Different PRS resource sets may have different periodicity. For example, one PRS resource set may be used for tracking, and another PRS resource that could be used for acquisition. Additionally or alternatively, one PRS resource set may have more beams, and another may have fewer beams. Accordingly, different resource sets may be used by a wireless network for different purposes.

Figure 8:
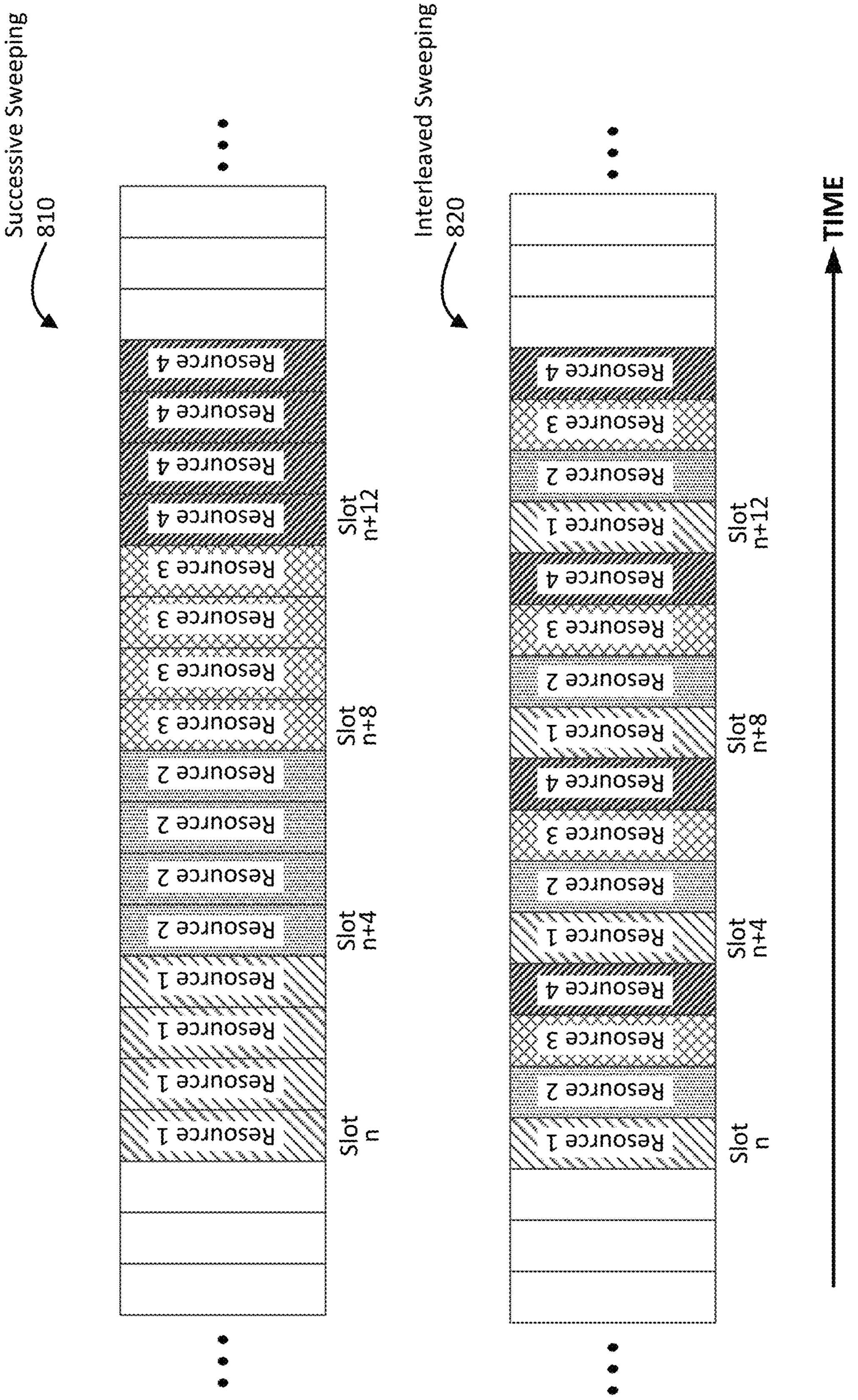
FIG. 8 is a time diagram illustrating two different options for slot usage of a resource set, according to an embodiment.

FIG. 8 is a time diagram illustrating two different options for slot usage of a resource set, according to an embodiment. Because each example repeats each resource four times, the resource set is said to have a repetition factor of four. Successive sweeping 810 comprises repeating a single resource (resource 1, resource 2, etc.) four times before proceeding to a subsequent resource. In this example, if each resource corresponds to a different beam of a TRP, the TRP repeats a beam for four slots in a row before moving to the next beam. Because each resource is repeated in successive slots (e.g., resource 1 is repeated in slots n, n+1, n+2, etc.), the time gap is said to be one slot. On the other hand, for interleaved sweeping 820, the TRP may move from one beam to the next for each subsequent slot, rotating through four beams for four rounds. Because each resource is repeated every four slots (e.g., resource 1 is repeated in slots n, n+4, n+8, etc.), the time gap is said to be one slot. Of course, embodiments are not so limited. Resource sets may comprise a different amount of resources and/or repetitions. Moreover, as noted above, each TRP may have multiple resource sets, multiple TRPs may utilize a single FL, and a UE may be capable of taking measurements of PRS resources transmitted via multiple FLs.

Thus, to obtain PRS measurements from PRS signals sent by TRPs and/or UEs in a network, the UE can be configured to observe PRS resources during a period of time called a measurement period. That is, to determine a position of the UE using PRS signals, a UE and a location server (e.g., LMF 220 of FIG. 2) may initiate a location session in which the UE is given a period of time to observe PRS resources and report resulting PRS measurements to the location server. As described in more detail below, this measurement period may be determined based on the capabilities of the UE.

To measure and process PRS resources during the measurement period, a UE can be configured to execute a measurement gap (MG) pattern. The UE can request a measurement gap from a serving TRP, for example, which can then provide the UE with the configuration (e.g., via Radio Resource Control (RRC) protocol).

As previously noted, reference signals such as the PRS resources previously described and illustrated with regard to FIG. 5-8 may be vulnerable to an attack that could interfere with in the position determination of a UE measuring these PRS resources. Other positioning reference signals, such as SRS resources transmitted by the UE and measured by one or more TRPs, also may be subject to such attacks. These attacks include "man-in-the-middle" attacks where a device transmits illegitimate reference signals (referred to herein as "attacker signals") that mimic legitimate reference signals (also referred to herein simply as "reference signals") received by the device. Additional details regarding these types of attacks are provided hereafter in reference to FIGS. 9A-9B.

Figure 9A:
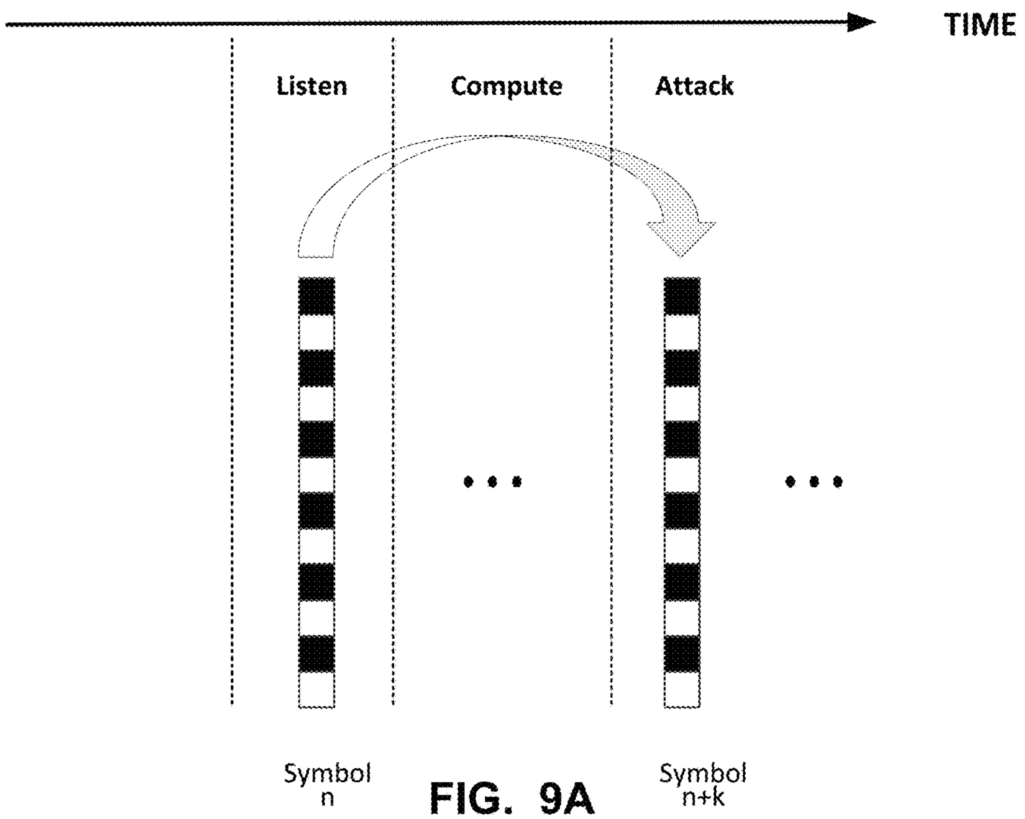
FIGS. 9A and 9B are diagrams illustrating examples of how man-in-the-middle attacks on reference signals may be performed.
Figure 9B:
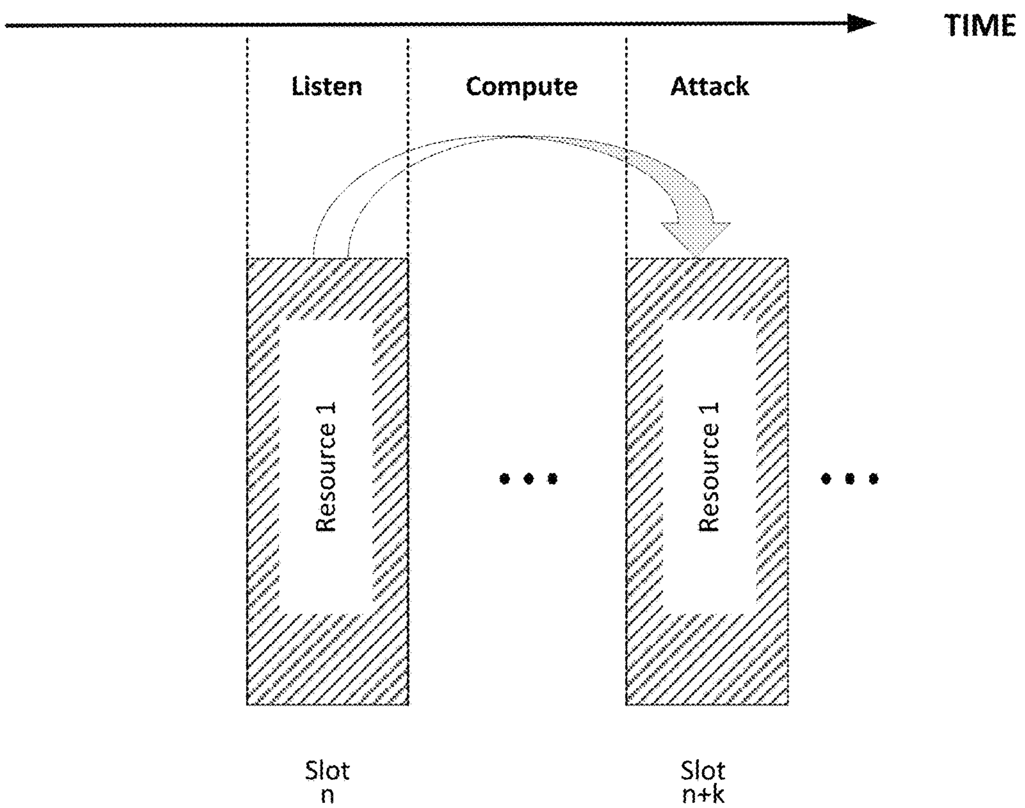

FIGS. 9A and 9B are diagrams illustrating examples of how man-in-the-middle attacks (or "spoofing") of reference signals may be performed by an attacking device on reference signals for positioning of a UE in a wireless network, from a physical layer perspective. Similar to FIGS. 4-6 and 8, time is represented on the horizontal axis, from left to right.

As illustrated, the functionality of an attacking device performing a man-in-the-middle attack may cycle through a "listen" mode to a "compute" mode, then to an "attack" mode. In the listen mode, the attacking device listens a first part of a reference signal, tuning one or more transceivers to capture portions of the reference signal transmitted on relevant frequencies. During the compute mode, the attacking device can use brute force or other algorithms to decode the portion of the transmitted reference signal, if decoding information is not previously known by the attacking device.

During the attack mode, the attacking device can make one or more transmissions to mimic a second part of the reference signal and/or subsequent reference signals.

FIG. 9A illustrates an "across-symbol" attack, which is an attack at the symbol level of a reference signal. Here, the attacking device may listen to one or more initial symbols (e.g., symbol n) of a legitimate reference signal and attack by mimicking one or more subsequent portions of the reference signal in one or more subsequent symbols (e.g., symbol n+k). The listen, compute, and attack modes of the attacking device may vary, depending factors such as the algorithms used to decode the symbol(s) listened to, the processing capabilities of the attacking device, etc. In some attacks, there may be several symbols between symbol n and symbol n+k. In other attacks, the attack may take place on the symbol immediately following the symbol listened to (i.e., k=1). In across-symbol attacks, the attack may take place in the same slot that the reference signal is transmitted in (i.e., symbol n and symbol n+k are in the same slot).

FIG. 9B illustrates an "across-slot" attack, which is an attack at the slot level of a reference signal. Here, the attacking device may listen to a first portion of a legitimate reference signal in a first slot (slot n) and attack by mimicking one or more subsequent portions of the reference signal in one or more subsequent slots (e.g., slot n+k). Similar to an across-symbol attack, the listen, compute, and attack modes of the attacking device may vary. In some attacks, there may be several slots between slot n and slot n+k. In other attacks, the attack may take place on the slot immediately following the slot listened to (i.e., k=1). In slot attacks, the attack may take place between a first repetition of a reference signal and subsequent repetitions of the reference signal.

As previously indicated, both across-symbol attacks and across-slot attacks may be made on different positioning resource signal types (e.g., DL-PRS, SL-PRS, SRS, etc.). Further, because the algorithm by which resource signals are encoded may be deterministic, an attacking device may continue attacking subsequent reference signals after successfully decoding a first part of the reference signal. For example, PRS resources are encoded with a scrambling ID that is generated using a pseudorandom sequence generator. Once an attacking device successfully decodes at least a portion of a PRS resource, it can determine the scrambling ID for that resource and use the pseudorandom sequence generator to generate the scrambling IDs for subsequent PRS resources in a sequence.

Figure 10A:
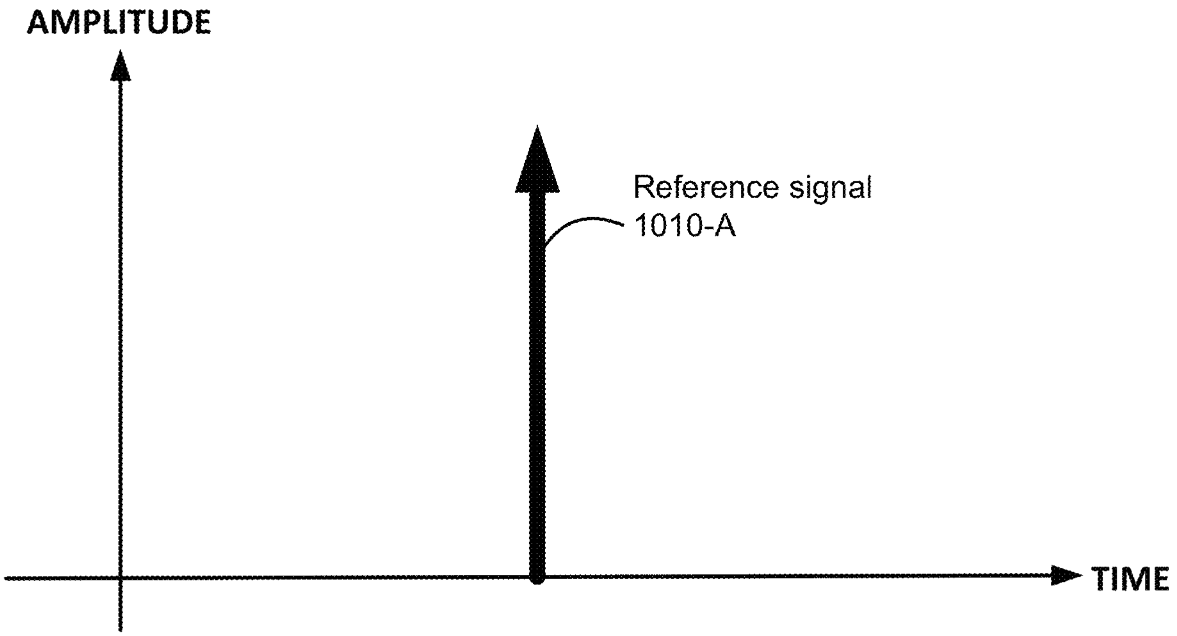
FIGS. 10A and 10B are diagrams that illustrate, from a timing perspective, how an attack may be perceived by receiving device, according to an embodiment.
Figure 10B:
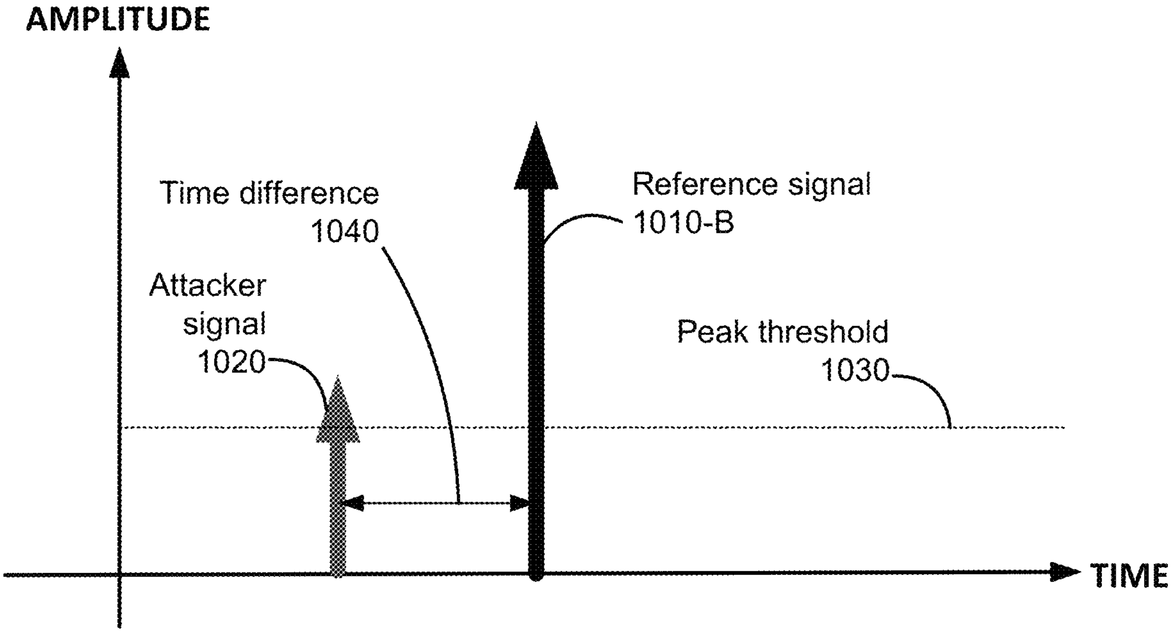

FIGS. 10A and 10B are diagrams that illustrate, from a timing perspective, how an attack may be perceived by receiving device. Because, attacks may be made on UL, DL, and SL reference signals (e.g., DL-PRS, SL-PRS, SRS, etc.), the type of receiving device may vary. For example, in some implementations, the receiving device may comprise a UE: either the target UE for positioning or an anchor UE in communication with the target UE via an SL interface. In other implementations, the receiving device may comprise a base station or TRP, such as the serving TRP of the target UE. In any case, an attack on reference signals measured by a receiving device can cause errors in the measurements made by the receiving device, which can lead to errors in the estimated location of the target UE.

FIG. 10A is a diagram of a reference signal 1010-A received by the receiving device. More specifically, the reference signal 1010-A may represent a correlation peak having a particular amplitude and received at a particular time. In practice, there may be multiple additional signals, which can include noise, multi path, etc. these additional signals can be filtered out using time and/or amplitude filtering techniques.

FIG. 10B is a diagram of a reference signal 1010-B similar to the reference signal 1010-A of FIG. 10A. Here, however, there is an additional attacker signal 1020 that precedes the reference signal 1010-B in time. And although the attacker signal 1020 may not have as large an amplitude as the reference signal 1010-B, the receiving device may interpret the attacker signal 1020 as the reference signal 1010-B if the attacker signal 1020 exceeds a peak threshold 1030 used to filter noise/multipath, etc.

If mistaken by the receiving device as the reference signal 1010-B, the attacker signal 1020 can cause an error in a measurement made by the receiving device for positioning of a target UE. For example, a time difference 1040 between the attacker signal 1020 and the legitimate reference signal 1010-B can cause an error in a timing measurement of the reference signal 1010-B by, for example, basing a ToA measurement (e.g., setting the ToA index) off of the time at which the attacker signal 1020 is received, rather than a time at which the reference signal 1010-B is received. Although sampling rates may vary, an attacker signal 1020 that precedes a reference signal 1010-B by just a few samples may result in a positioning error of many meters. This can be highly problematic in applications such as automated driving, where such an error in the estimated position of a vehicle may compromise the safety of passengers, pedestrians, and others.

Embodiments herein help identify man-in-the-middle attacks, including across-symbol and across-slot attacks, by performing consistency checks. In particular, one or more properties of a received signal can be compared with expected values for the one or more properties, based on other received signals from the transmitting device and/or calculated values, to determine whether an attacker signal is present. These consistency checks may comprise time-domain consistency checks and/or angle-domain consistency checks.

Figure 11:
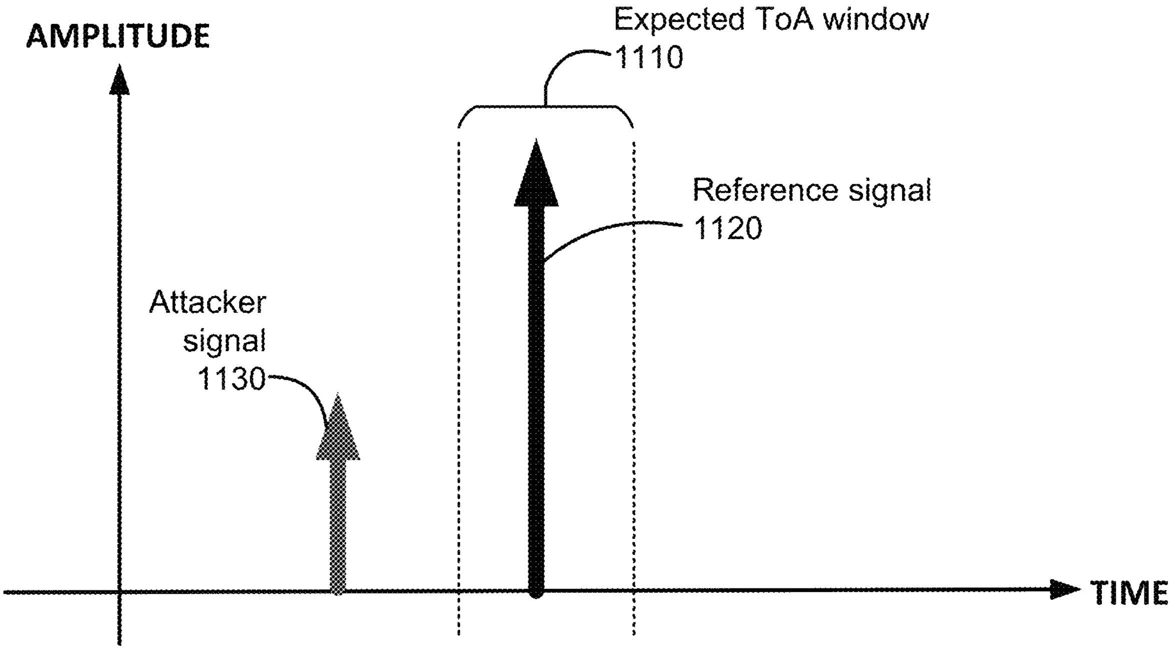
FIGS. 11 and 12 are timing diagrams that illustrate different types of time-domain consistency checks that can be made, according to some embodiments.
Figure 12:
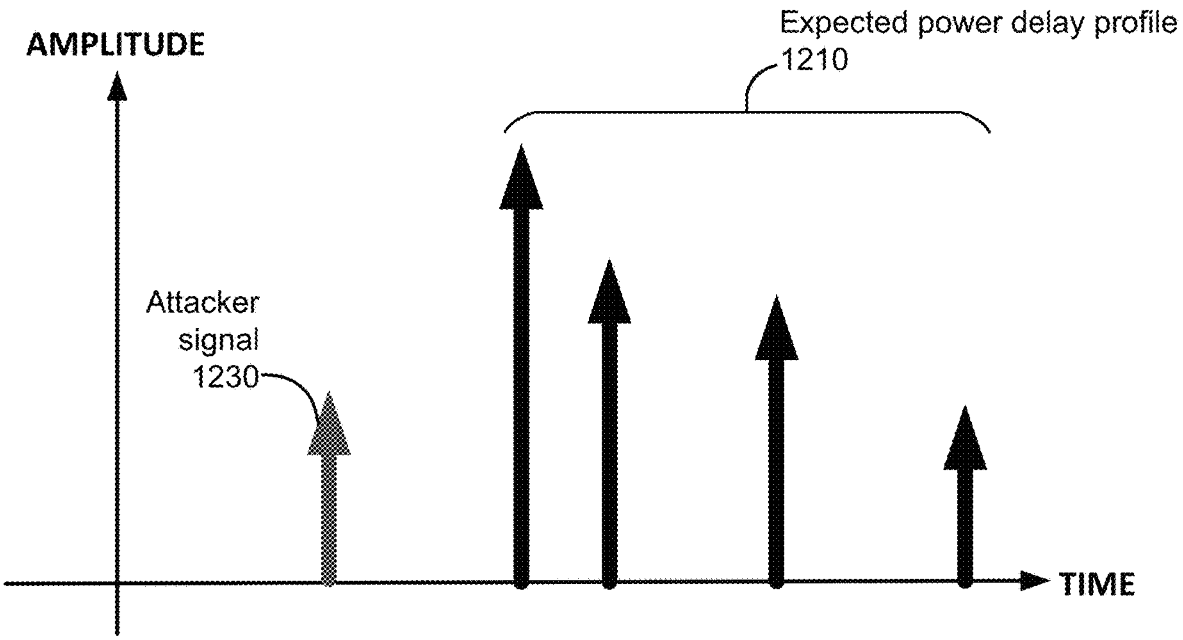

FIGS. 11 and 12 are timing diagrams that illustrate different types of time-domain consistency checks that can be made, according to some embodiments. These consistency checks compare one or more properties of Channel Energy Response (CER) derived from a received signal with one or more corresponding CER properties derived from other received signals.

FIG. 11, for example, illustrates how ToA of a first arrival peak can be used. By measuring the first arrival peak for N parts of a reference signal, where N is equal to or greater than 1, the receiving device can establish an expected ToA window 1110 during which a subsequent reference signal 1120 is expected to be received. (As explained in further detail below, the "parts" of the reference signal may vary, depending on desired functionality.) The expected ToA window 1110 may allow for movement of the receiving device (if mobile) using, for example, movement sensor information from the receiving device. Additionally or alternatively, the expected ToA window 1110 may account for variance in the ToAs of a threshold amount of variability that would exclude an attacker signal 1130.

FIG. 12 illustrates how an expected power delay profile 1210 can be used. In a manner similar to establishing the expected ToA window 1110 in FIG. 11, the receiving device can measure a power delay profile for N parts of a received signal, where N is equal to or greater than 1, to establish an expected power delay profile 1210. The expected power delay profile 1210 also may allow for movement of the receiving device and may allow for variance in the timing and/or amplitude of the various peaks of the expected power delay profile 1210 within a threshold that would exclude an attacker signal 1230 (e.g., peaks varying within X and/or Y, where X is in the order of 1/signal BW and Y is a variance of amplitude in the order of noise variance).

Figure 6:
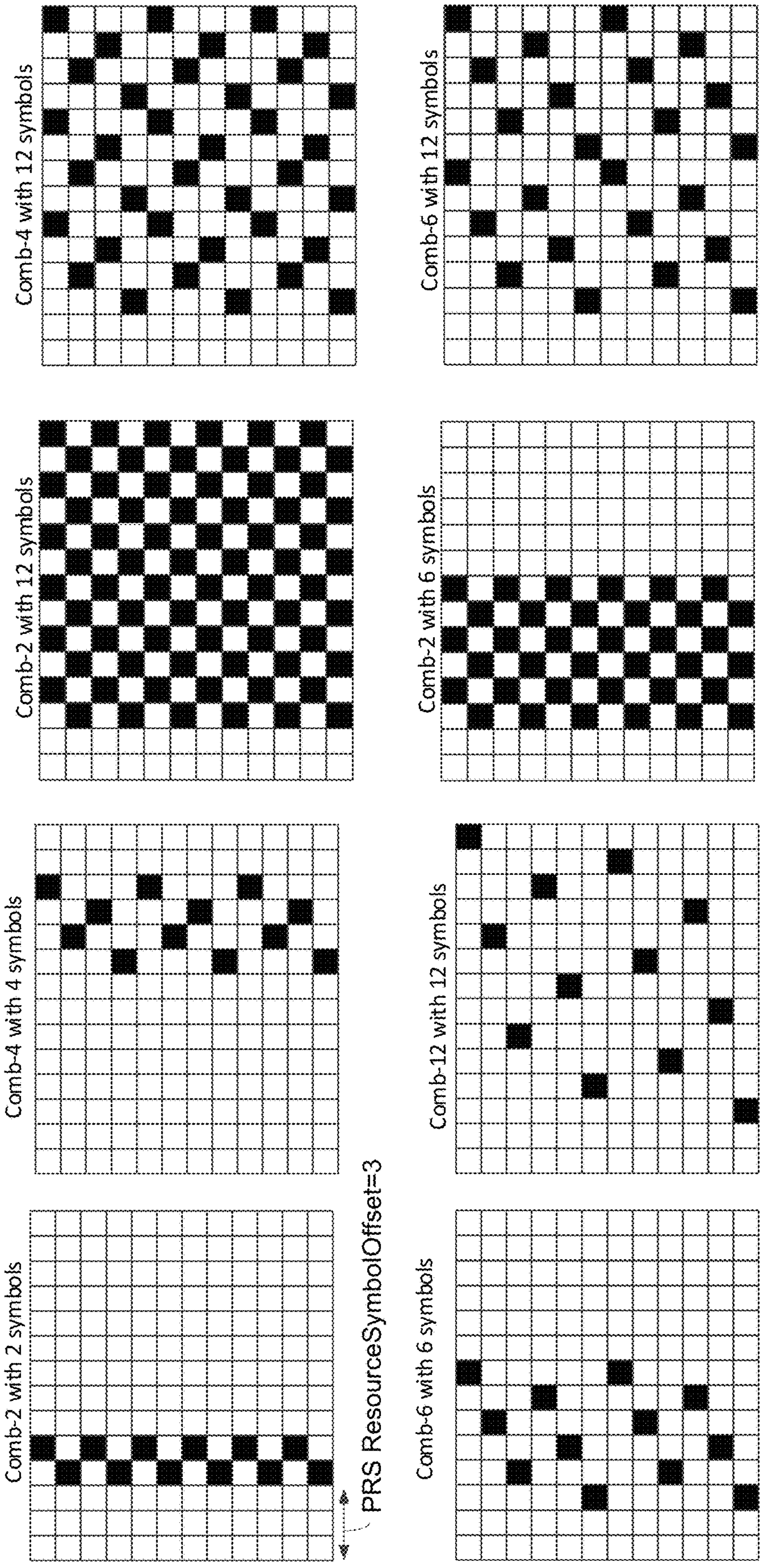
FIG. 6 illustrates multiple example comb structures that can be used for communicating reference signals for positioning, according to an embodiment.

Depending on desired functionality, the "parts" of the reference signal used to establish the expected ToA window 1110 in FIG. 11 and/or the expected power delay profile 1210 of FIG. 12 may comprise different symbols of the reference signal (e.g., within a slot) and/or different repetitions of the reference signal (e.g., across one or more slots). In other words, the consistency check illustrated in FIGS. 11 and 12 may comprise an across-symbol consistency check and/or an across-slot consistency check. Where an across-symbol consistency check is made, a ToA peak or power delay profile can be estimated for each symbol, where a signal comprising a comb N structure (e.g., as illustrated in FIG. 6) can result in N ToA peaks/power delay profiles.

In addition or as an alternative to performing CER consistency checks across symbols and/or repetitions/slots, embodiments may perform CER consistency checks across different signals (which may include comparing CER of symbols and/or slots of different signals). That is, one or more CER properties (e.g., ToA or power delay profile) of a received signal can be compared with other signals transmitted by the device that transmits the reference signal, to determine whether the received signal is a reference signal or attacker signal (or combination of reference signal and attack signal). This check can be a helpful check because certain types of reference signals (e.g., DL-PRS) may be broadcast, and therefore the information to decode the reference signals (e.g., a scrambling ID) may be widely known by many devices, including an attacker device. Different signals that may be used for comparison to perform CER consistency checks, according to some embodiments, may comprise separately transmitted signals that are unicast directly to the receiving device from the transmitting device. These comparison signals can include a Tracking Reference Signal (TRS), a Channel State Information Reference Signal (CSI-RS), or a Demodulation Reference Signal (DMRS), for example. To help ensure these comparison signals have a comparable CER as the reference signal for consistency check purposes, embodiments may use comparison signals that are Quasi-Co-Located (QCLed) with the reference signal.

It can be noted that time-domain consistency checks may not necessarily be limited to the across-symbol and/or across-slot checks described above with regard to one or more CER properties. Similar consistency checks may be used for other signal values, such as Reference Signal Received Power (RSRP).

Figure 13A:
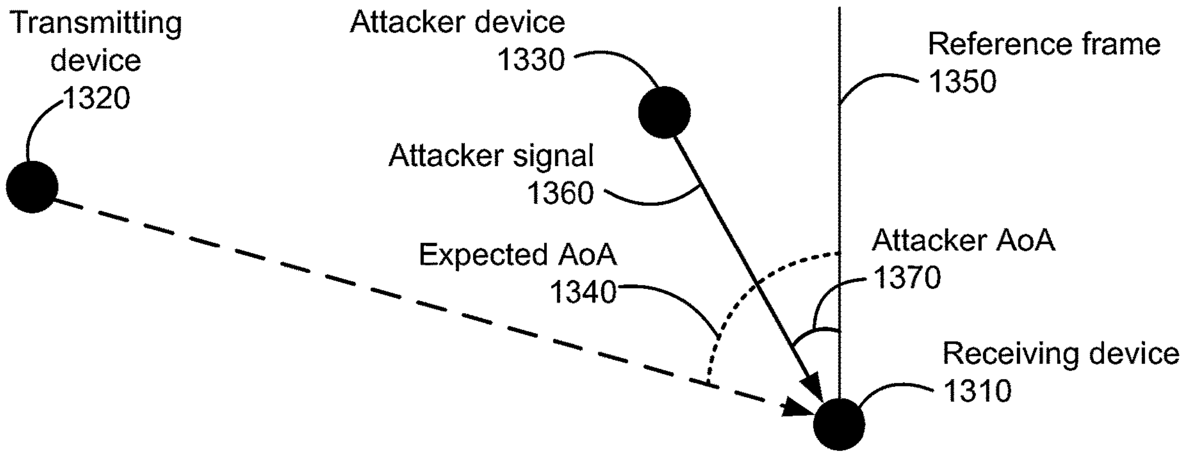
FIGS. 13A and 13B are diagrams illustrating different types of angle consistency checks that can be made, according to some embodiments.
Figure 13B:
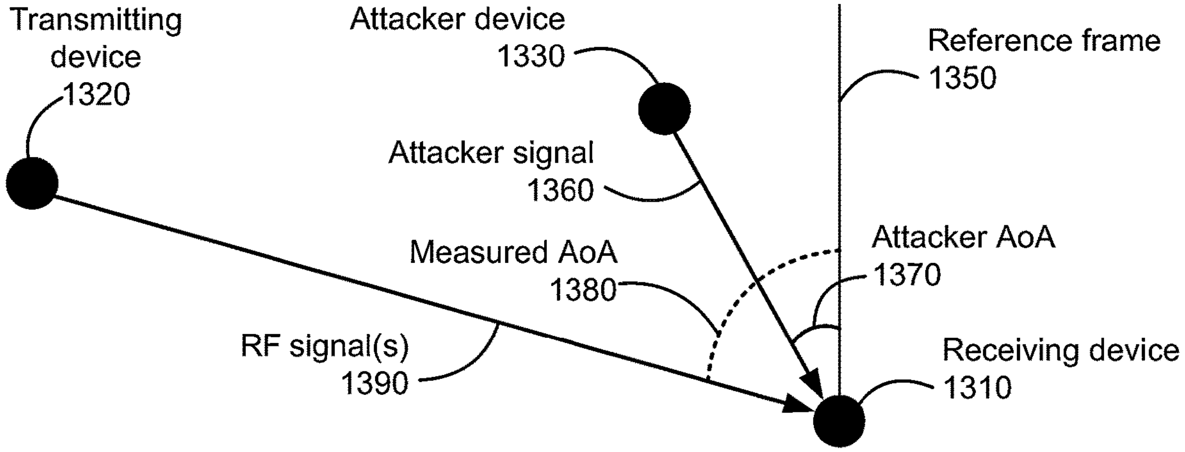

FIGS. 13A and 13B are diagrams of the relative positions of a receiving device 1310, transmitting devices 1320, and attacker device 1330 that illustrate different types of angle consistency checks that can be made, according to some embodiments. These consistency checks compare angle measurements of a received signal (e.g., using beamforming in the manner previously described with respect to FIG. 3) with expected or actual angle measurements from a transmitting device. Angles may be made with regard to a reference frame 1350 to account for any changes in orientation of the receiving device 1310.

FIG. 13A for example, illustrates how a receiving device 1310 can compare an AoA of a received signal with an expected AoA based on a calculated position of the transmitting device 1320. Specifically, the receiving device 1310 can use its known or estimated position (location and, optionally, orientation) and a known or estimated position of the transmitting device 1320 to calculate an expected AoA 1340, which may be calculated relative to a reference frame 1350 (e.g., and East North Up (ENU) frame, global coordinate system, etc.). Positions of the receiving device 1310 and/or transmitting device 1320 may be known for fixed devices, or may be estimated for mobile devices (e.g., using a previous position fix, non-RAT positioning method (e.g., GNSS-based positioning), etc.). In some embodiments, an estimated position of a UE (e.g., a previous position fix) may be provided in assistance data to the receiving device 1310 by a location server. Using this information, the receiving device 1310 can then compare the expected AoA 1340 with an AoA estimated based on a received signal. As illustrated in FIG. 13A, an attacker signal 1360 transmitted by the attacker device 1330 may result in an attacker AoA 1370 that is different than the expected AoA 1340. According to some embodiments, a difference between the expected AoA 1340 and attacker AoA 1370 is beyond a threshold amount (e.g., a range of ±5°, 10°, 15°, etc.), then the attacker signal 1360 would fail the angle domain consistency check.

FIG. 13B illustrates a variation of the implementation illustrated in FIG. 13A. Here, in addition or as an alternative to calculating an expected AoA 1340, the receiving device 1310 measures an AoA (measured AoA 1380) from one or more RF signals 1390 transmitted by the transmitting device 13020. The RF signal(s) may be reference signals used for positioning (e.g., DL-PRS, SL-PRS, etc.) or, similar to the time-domain embodiments described previously, may be comparison signals that are QCLed to a reference signal. Thus, the implementation of 13B introduces a time-domain element to the angle-domain consistency check. Again, a threshold may be set based on received RF signal(s) 1390 to determine whether a received signal is an attacker signal 1360 or a legitimate reference signal.

It can be noted that angle-domain consistency checks can be performed in addition or as an alternative to time-domain consistency checks. Moreover, according to some embodiments, these checks may be performed simultaneously, using the same signals. For example, according to some embodiments, RF signal(s) 1390 used to perform angle-domain consistency checks may also be used to perform time-domain consistency checks as described previously. This can be beneficial in several ways, because the different consistency checks can complement each other. For example, time-domain consistency checks may identify an attacker signal in cases where the attacker signal and a reference signal are received at roughly the same AoA (e.g., the attacker device 1330 and transmitting device 1320 are aligned, from the perspective of the receiving device 1310). On the other hand, an AoA consistency check may identify an attacker signal in cases where a consistency check comparing CER values fails to do so.

When an attack is determined, a receiving device can alert other devices, such as the transmitting device, a location server, and/or nearby devices, by sending a message including a report of the attack. The information included in the report may comprise, without limitation, an identity of the reference signal (e.g., reference signal ID) that was attacked, for each attack instance (this may include a symbol index if an attack is detected at a symbol level); a time stamp, frequency, and/or time duration of the attack; an estimated location of the attacker, which may include relative information such as range and/or angle; information regarding signal properties of the attack, such as power and/or frequency bandwidth; and the like. In implementations where the receiving device 1310 is a UE, the receiving device 1310 may provide an indication of its own position at the time the attack happened.

Depending on desired functionality, the type of communication link between the receiving device 1310 and location server, and/or other factors, the means by which the receiving device 1310 provides the report to the location server may vary. For example, the attack report may be provided via an Uplink Control Information (UCI) message, a Media Access Control-Control Element (MAC-CE) message, an LTE Positioning Protocol (LPP) message, or a Radio Resource Control (RRC) message. Moreover, the report may be periodic, aperiodic, or semi-persistent. According to some embodiments, the attack report may also be given a higher priority in uplink transmission then other communication (e.g., other location information/reporting provided by the receiving device 1310).

Further, depending on desired functionality, a report of the attack may be transmitted to other devices. As noted, this may include the receiving device 1310 reporting to the transmitting device 1320. Additionally or alternatively, the receiving device 1310 may report the attack via broadcast and/or unicast to nearby devices (e.g., nearby UEs).

According to some embodiments, the report may be provided on demand, in response to a request from the location server and/or from a TRP. For example, the receiving device 1310 (which again, may comprise a UE or TRP) may receive a request by a location server to report attack detection metrics. These metrics may be specific to a certain set of reference signal resources, resource sets, or TRP is, for example.

Upon receiving a report of an attack, the response by the receiving device 1310 and/or location server may vary. According to some embodiments, for example, the receiving device 1310 may request to cancel remaining reference signal transmissions based on an attack detection. This may be helpful for further detection of the attack source, since the attacker may not be aware of an early cancellation of reference signal transmissions. This could result in the attacker device 1330 transmitting attacker signals 1360 after the transmitting device 1320 stops transmitting reference signals 1390, making further detection easier.

It can be noted that, although the description with regard to FIGS. 13A and 13B is directed toward using AoA measurements for angle-domain consistency checks, embodiments are not so limited. According to some embodiments, angle-domain consistency checks may be performed using AoD measurements, where the receiving device 1310 makes a measurement (e.g., a RSRP) of a received signal to determine, based on measurements of other RF signals transmitted using other beams, an AoD. If the determined AoD does not match (e.g., within a threshold angle) the AoD of other RF signals 1390 transmitted by the transmitting device 1320, and/or if the determined AoD does not match (within a threshold angle) an expected AoD based on known positions of the transmitting devices 1320 and receiving devices 1310, then the received signal may fail the angle-domain consistency check and be determined to be an attacker signal.

Figure 14A:
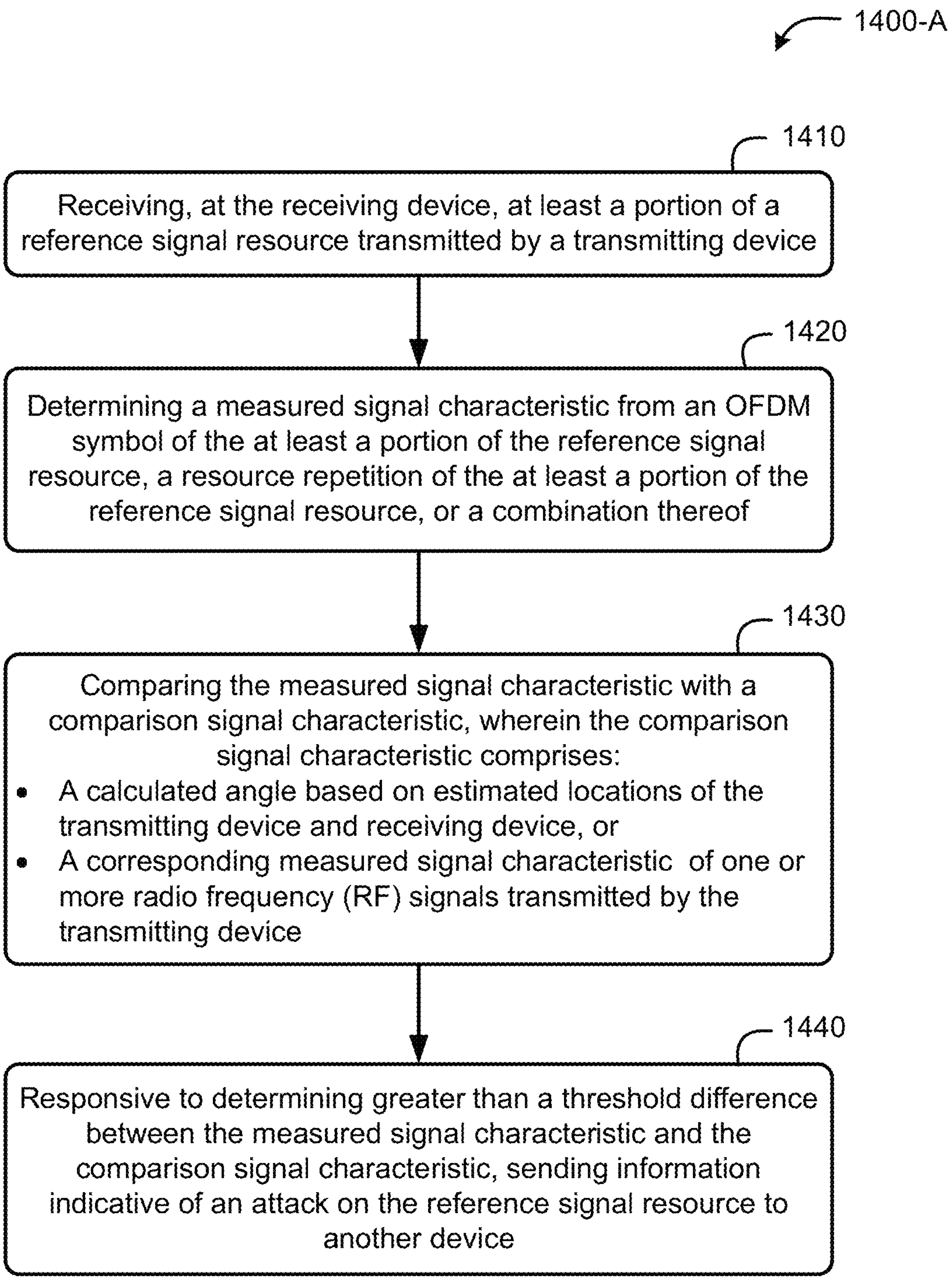
FIGS. 14A and 14B are flow diagrams of methods of detecting an attack on reference signals used for positioning of a UE in a wireless communication network, according to some embodiments.

FIG. 14A is a flow diagram of a method 1400-A of detecting an attack on reference signals used for positioning of a UE in a wireless communication network, according to an embodiment. Means for performing the functionality illustrated in one or more of the blocks shown in FIG. 14A may be performed by hardware and/or software components of a receiving device, such as a UE or TRP. Example components of a UE are illustrated in FIG. 15, and example components of a TRP are illustrated in FIGS. 16, both of which are described in more detail below.

At block 1410, the functionality comprises receiving, at the receiving device, at least a portion of a reference signal resource transmitted by a transmitting device. As noted in the previously-described embodiments, the receiving device and transmitting device may vary, depending on implementation. If the receiving device comprises a UE, the reference signal resource may comprise a PRS resource, and the transmitting device may comprise another UE (e.g., transmitting SL-PRS) or a TRP (e.g., transmitting DL-PRS). If the receiving device comprises a TRP, the reference signal resource may comprise an SRS resource, and the transmitting device may comprise a UE.

Figure 15:
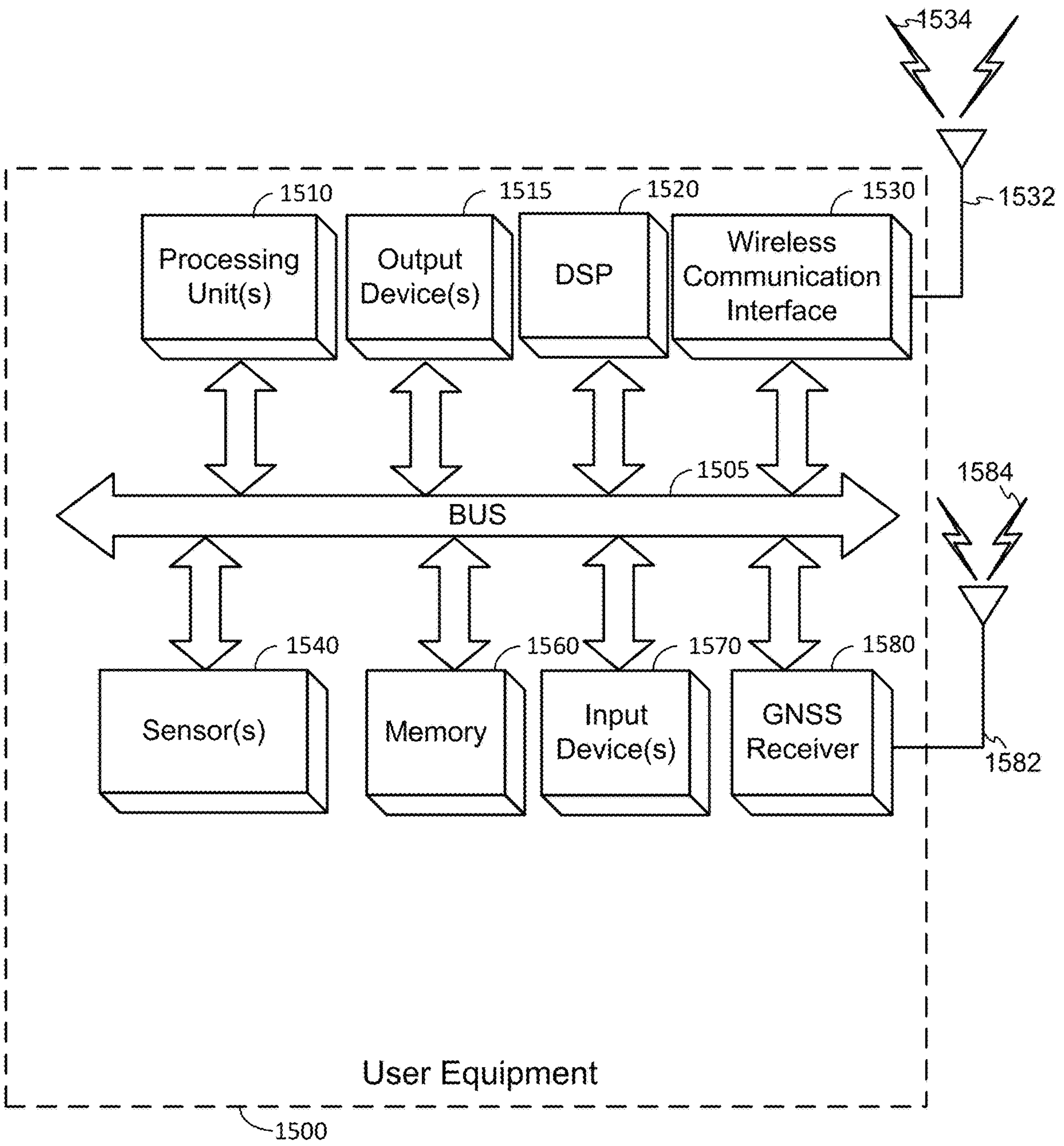
FIG. 15 is a block diagram of an embodiment of a UE, which can be utilized in embodiments as described herein.
Figure 16:
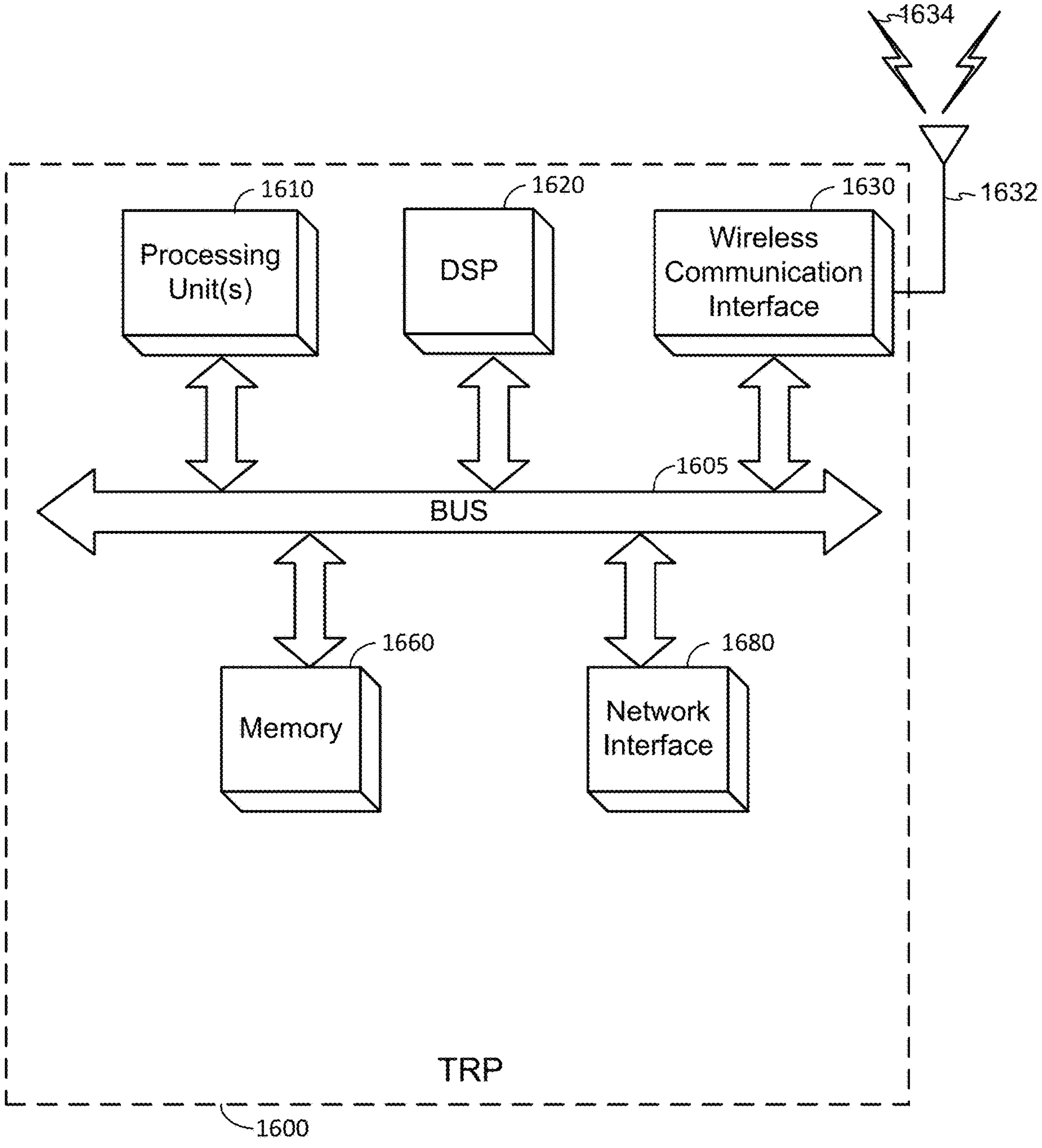
FIG. 16 is a block diagram of an embodiment of a Transmission Reception Point (TRP), which can be utilized in embodiments as described herein.

Means for performing functionality at block 1410 may comprise, for example, a bus 1505, processing unit(s) 1510, digital signal processor (DSP) 1520, wireless communication interface 1530, memory 1560, and/or other components of a UE 1500, as illustrated in FIG. 15. Alternatively, means for performing functionality at block 1410 may comprise, for example, a bus 1605, processing unit(s) 1610, DSP 1620, wireless communication interface 1630, memory 1660, and/or other components of a TRP 1600, as illustrated in FIG. 16.

The functionality at block 1420 comprises determining a measured signal characteristic from an OFDM symbol of the at least a portion of the reference signal resource, a resource repetition of the at least a portion of the reference signal resource, or a combination thereof. As noted previously, embodiments may determine across-symbol attacks and/or across-slot (or resource) attacks. As such, the "at least a portion of a reference signal" received at block 1410 may comprise at least a portion of a symbol or resource of the reference signal resource.

Means for performing functionality at block 1420 may comprise, for example, a bus 1505, processing unit(s) 1510, digital signal processor (DSP) 1520, wireless communication interface 1530, memory 1560, and/or other components of a UE 1500, as illustrated in FIG. 15. Alternatively, means for performing functionality at block 1420 may comprise, for example, a bus 1605, processing unit(s) 1610, DSP 1620, wireless communication interface 1630, memory 1660, and/or other components of a TRP 1600, as illustrated in FIG. 16.

At block 1430, the functionality comprises comparing the measured signal characteristic with a comparison signal characteristic, wherein the comparison signal characteristic comprises (i) a calculated angle based on estimated locations of the transmitting device and receiving device, or (ii) a corresponding measured signal characteristic of one or more radio frequency (RF) signals transmitted by the transmitting device. These different comparison types (i) and (ii) may correspond, for example, with respective angle-domain consistency checks and time-domain consistency checks in the previously described embodiments. For time-domain consistency checks, or angle-domain consistency checks with a time-domain element, one or more RF signals may comprise one or more additional OFDM symbols of the reference signal resource, one or more additional resource repetitions of the reference signal resource, or a combination thereof. Additionally or alternatively, as previously noted, consistency checks may be made using comparison signals. As such, according to some embodiments of the method 1400, the one or more RF signals comprise a separately transmitted signal QCLed with the again, this separately transmitted signal may comprise a TRS, CSI-RS, or DMRS, for example.

As noted in the above-described embodiments, the measured signal characteristic may vary, depending on desired functionality. According to some embodiments, the measured signal characteristic and the corresponding measured signal characteristic each comprise a peak location of a CER, or a power delay profile of the CER, or a combination thereof. The peak location of a CER may comprise a first arrival peak, or ToA, as noted previously. According to some embodiments the measured signal characteristic and the corresponding measured signal characteristic each comprise an AoA, AoD, or a combination thereof. Additionally or alternatively, the measured signal characteristic and the corresponding measured signal characteristic each comprise a Reference Signal Received Power (RSRP).

Means for performing functionality at block 1430 may comprise, for example, a bus 1505, processing unit(s) 1510, digital signal processor (DSP) 1520, memory 1560, and/or other components of a UE 1500, as illustrated in FIG. 15. Alternatively, means for performing functionality at block 1430 may comprise, for example, a bus 1605, processing unit(s) 1610, DSP 1620, memory 1660, and/or other components of a TRP 1600, as illustrated in FIG. 16.

At block 1440, the functionality comprises, responsive to determining greater than a threshold difference between the measured signal characteristic and the comparison signal characteristic, sending information indicative of an attack on the reference signal resource to another device. As indicated in the previously-described embodiments, the report may include any of a variety of types of information to help identify the reference signal resource(s) attacked and/or the location of the attacker device. Thus, according to some embodiments, the information indicative of an attack on the reference signal resource may comprise a resource ID, a symbol index, a time stamp, a frequency, an indication of the measured signal characteristic, a position of the UE, or a combination thereof.

Again, the device to which the information is sent may vary, depending on desired functionality. In some embodiments, the receiving device may send the information to multiple devices. According to some embodiments, sending information indicative of an attack on the reference signal resource to another device comprises sending the information to a location server via a UCI message, a MAC-CE message, an LPP message, or an RRC message, or a combination thereof. Additionally or alternatively, sending information indicative of an attack on the reference signal resource to another device comprises sending the information wirelessly to the UE, one or more additional UEs, or both.

The functionality at block 1440 comprises determining a measured signal characteristic from an OFDM symbol of the at least a portion of the reference signal resource, a resource repetition of the at least a portion of the reference signal resource, or a combination thereof. As noted previously, embodiments may determine across-symbol attacks and/or across-slot (or resource) attacks. As such, the "at least a portion of a reference signal" received at block 1440 may comprise at least a portion of a symbol or resource of the reference signal resource.

Means for performing functionality at block 1440 may comprise, for example, a bus 1505, processing unit(s) 1510, digital signal processor (DSP) 1520, wireless communication interface 1530, memory 1560, and/or other components of a UE 1500, as illustrated in FIG. 15. Alternatively, means for performing functionality at block 1440 may comprise, for example, a bus 1605, processing unit(s) 1610, DSP 1620, wireless communication interface 1630, memory 1660, and/or other components of a TRP 1600, as illustrated in FIG. 16.

Figure 14B:
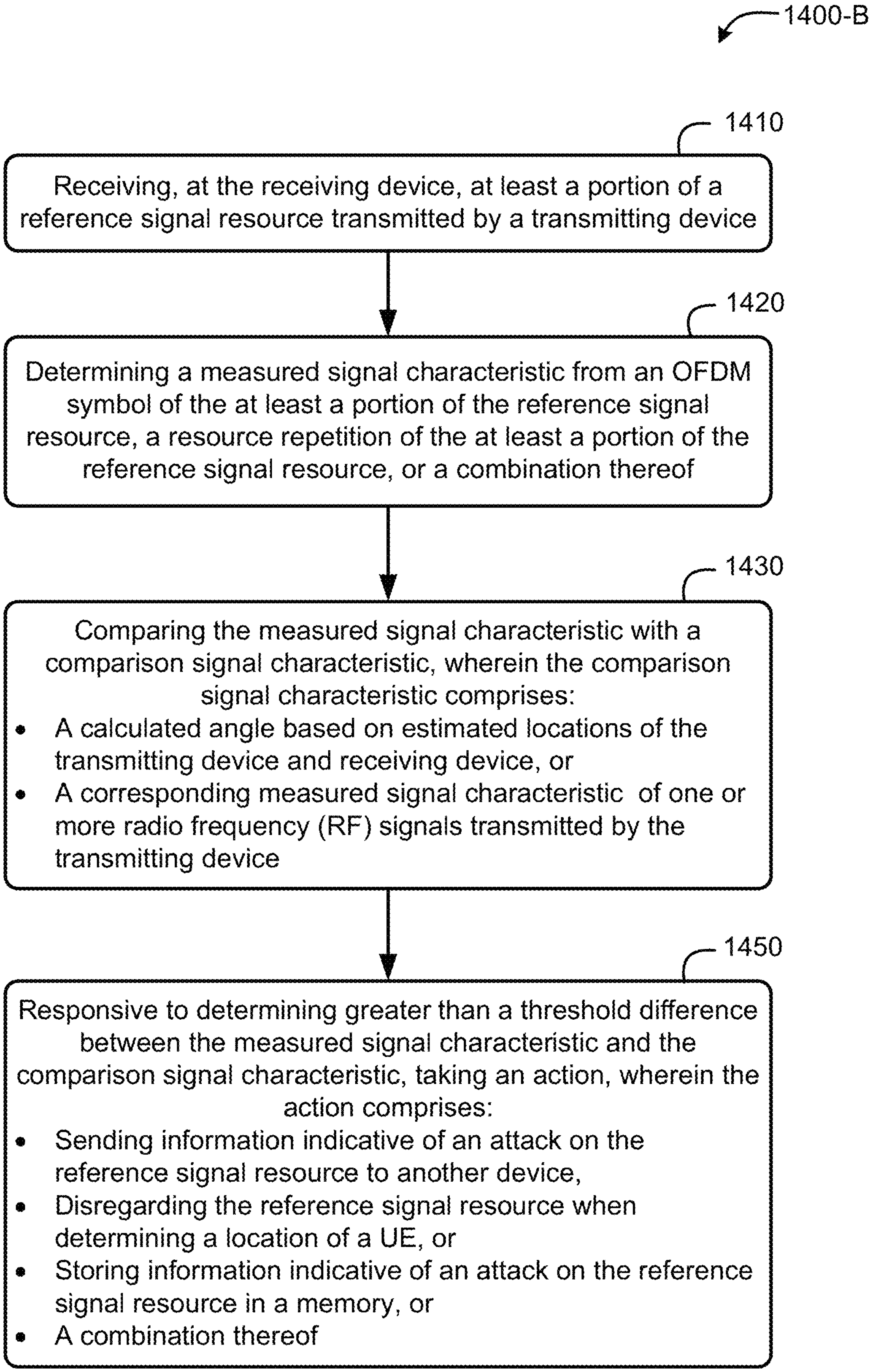

FIG. 14B is a flow diagram of another method 1400-B of detecting an attack on reference signals used for positioning of a UE in a wireless communication network, according to an embodiment. Again, means for performing the functionality illustrated in one or more of the blocks shown in FIG. 14B may be performed by hardware and/or software components of a receiving device, such as a UE or TRP.

Method 1400-B is a variation to method 1400-A of FIG. 14A, where the functions at blocks 1410-1430 are the same as those illustrated in FIG. 14A. In FIG. 14B, however, additional or alternative actions may be taken when responsive to determining greater than a threshold difference between the measured signal characteristic and the comparison signal characteristic. Specifically, the functionality at block 1450 comprises, responsive to determining greater than a threshold difference between the measured signal characteristic and the comparison signal characteristic, taking an action, wherein the action comprises sending information indicative of an attack on the reference signal resource to another device, disregarding the reference signal resource when determining a location of a UE, or storing information indicative of an attack on the reference signal resource in a memory, or a combination thereof.

The action taken may vary, depending on desired functionality, individual circumstances, and/or other factors. Disregarding the reference signal resource when determining a location of a UE may comprise using one or more other reference signal resources, which are not determined to be subject to an attack, to determine the location of the UE. Such reference signal resources may comprise, for example, any reference signal resources received prior to the detected attack. Storing information indicative of an attack on the reference signal resource in a memory may enable the receiving device to gather attack information locally, which may enable the receiving device to track an attacker device over time, store multiple attack reports for batch reporting/processing, etc. According to some embodiments, additional or alternative actions to those shown in block 1450 may be taken.

Means for performing functionality at block 1450 may comprise, for example, a bus 1505, processing unit(s) 1510, digital signal processor (DSP) 1520, wireless communication interface 1530, memory 1560, and/or other components of a UE 1500, as illustrated in FIG. 15. Alternatively, means for performing functionality at block 1450 may comprise, for example, a bus 1605, processing unit(s) 1610, DSP 1620, wireless communication interface 1630, memory 1660, and/or other components of a TRP 1600, as illustrated in FIG. 16.

FIG. 15 illustrates an embodiment of a UE 1500, which can be utilized as described herein above. For example, the UE 1500 may correspond with UEs and/or mobile devices described in FIGS. 1-14 and can perform one or more of the functions of the method shown in FIG. 14. It should be noted that FIG. 15 is meant only to provide a generalized illustration of various components, any or all of which may be utilized as appropriate. It can be noted that, in some instances, components illustrated by FIG. 15 can be localized to a single physical device and/or distributed among various networked devices. Furthermore, as previously noted, the functionality of the UE discussed in the previously described embodiments may be executed by one or more of the hardware and/or software components illustrated in FIG. 15.

The UE 1500 is shown comprising hardware elements that can be electrically coupled via a bus 1505 (or may otherwise be in communication, as appropriate). The hardware elements may include a processing unit(s) 1510 which can include without limitation one or more general-purpose processors, one or more special-purpose processors (such as DSP chips, graphics acceleration processors, application specific integrated circuits (ASICs), and/or the like), and/or other processing structures or means. As shown in FIG. 15, some embodiments may have a separate DSP 1520, depending on desired functionality. Location determination and/or other determinations based on wireless communication may be provided in the processing unit(s) 1510 and/or wireless communication interface 1530 (discussed below). The UE 1500 also can include one or more input devices 1570, which can include without limitation one or more keyboards, touch screens, touch pads, microphones, buttons, dials, switches, and/or the like; and one or more output devices 1515, which can include without limitation one or more displays (e.g., touch screens), light emitting diodes (LEDs), speakers, and/or the like.

The UE 1500 may also include a wireless communication interface 1530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1500 to communicate with other devices as described in the embodiments above. The wireless communication interface 1530 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1532 that send and/or receive wireless signals 1534. According to some embodiments, the wireless communication antenna(s) 1532 may comprise a plurality of discrete antennas, antenna arrays, or any combination thereof. The antenna(s) 1532 may be capable of transmitting and receiving wireless signals using beams (e.g., Tx beams and Rx beams). Beam formation may be performed using digital and/or analog beam formation techniques, with respective digital and/or analog circuitry. The wireless communication interface 1530 may include such circuitry.

Depending on desired functionality, the wireless communication interface 1530 may comprise a separate receiver and transmitter, or any combination of transceivers, transmitters, and/or receivers to communicate with TRPs/base stations (e.g., ng-eNBs and gNBs) and other terrestrial transceivers, such as wireless devices and access points. The UE 1500 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 4" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1500 can further include sensor(s) 1540. Sensor (s) 1540 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1500 may also include a Global Navigation Satellite System (GNSS) receiver 1580 capable of receiving signals 1584 from one or more GNSS satellites using an antenna 1582 (which could be the same as antenna 1532). Positioning based on GNSS signal measurement can be utilized to complement and/or incorporate the techniques described herein. The GNSS receiver 1580 can extract a position of the UE 1500, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1580 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1580 is illustrated in FIG. 15 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1510, DSP 1520, and/or a processing unit within the wireless communication interface 1530 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1510 or DSP 1520.

The UE 1500 may further include and/or be in communication with a memory 1560. The memory 1560 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1560 of the UE 1500 also can comprise software elements (not shown in FIG. 15), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1560 that are executable by the UE 1500 (and/or processing unit(s) 1510 or DSP 1520 within UE 1500). In an aspect, then such code and/or instructions can be used to configure and/or adapt a general-purpose computer (or other device) to perform one or more operations in accordance with the described methods.

FIG. 16 illustrates an embodiment of a TRP 1600, which can be utilized as described herein above. For example, the TRP 1600 may correspond with TRPs and/or base stations (e.g., gNBs, eNBs, ng-eNBs, etc.) previously described in reference to FIGS. 1-14 and can perform one or more of the functions of the method shown in FIG. 14. It should be noted that FIG. 16 is meant only to provide a generalized illustration of various components, any or all of which may be utilized as appropriate.

The TRP 1600 is shown comprising hardware elements that can be electrically coupled via a bus 1605 (or may otherwise be in communication, as appropriate). The hardware elements may include a processing unit(s) 1610 which can include without limitation one or more general-purpose processors, one or more special-purpose processors (such as DSP chips, graphics acceleration processors, ASICs, and/or the like), and/or other processing structure or means. As shown in FIG. 16, some embodiments may have a separate DSP 1620, depending on desired functionality. Location determination and/or other determinations based on wireless communication may be provided in the processing unit(s) 1610 and/or wireless communication interface 1630 (discussed below), according to some embodiments. The TRP 1600 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1600 might also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1600 to communicate as described herein. The wireless communication interface 1630 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna (s) 1632 that send and/or receive wireless signals 1634.

The TRP 1600 may also include a network interface 1680, which can include support of wireline communication technologies. The network interface 1680 may include a modem, network card, chipset, and/or the like. The network interface 1680 may include one or more input and/or output communication interfaces to permit data to be exchanged with a network, communication network servers, computer systems, and/or any other electronic devices described herein.

In many embodiments, the TRP 1600 may further comprise a memory 1660. The memory 1660 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1660 of the TRP 1600 also may comprise software elements (not shown in FIG. 16), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1660 that are executable by the TRP 1600 (and/or processing unit(s) 1610 or DSP 1620 within TRP 1600). In an aspect, then such code and/or instructions can be used to configure and/or adapt a general-purpose computer (or other device) to perform one or more operations in accordance with the described methods.

Figure 17:
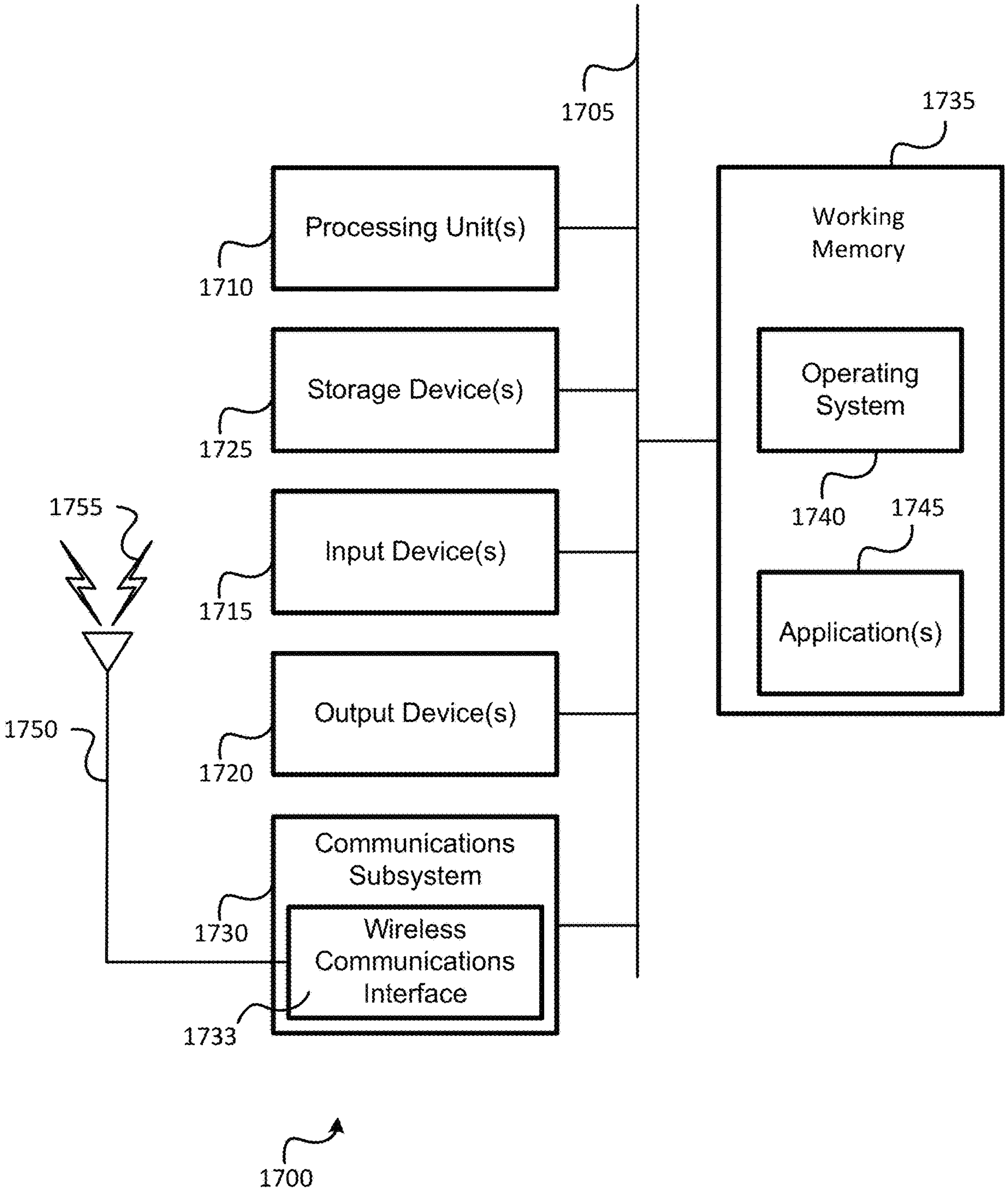
FIG. 17 is a block diagram of an embodiment of a computer system, which can be utilized in embodiments as described herein.

FIG. 17 is a block diagram of an embodiment of a computer system 1700, which may be used, in whole or in part, to provide the functions of one or more network components as described in the embodiments herein, such as a location server. It should be noted that FIG. 17 is meant only to provide a generalized illustration of various components, any or all of which may be utilized as appropriate. FIG. 17, therefore, broadly illustrates how individual system elements may be implemented in a relatively separated or relatively more integrated manner. In addition, it can be noted that components illustrated by FIG. 17 can be localized to a single device and/or distributed among various networked devices, which may be disposed at different geographical locations.

The computer system 1700 is shown comprising hardware elements that can be electrically coupled via a bus 1705 (or may otherwise be in communication, as appropriate). The hardware elements may include processing unit(s) 1710, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1700 also may comprise one or more input devices 1715, which may comprise without limitation a mouse, a keyboard, a camera, a microphone, and/or the like; and one or more output devices 1720, which may comprise without limitation a display device, a printer, and/or the like.

The computer system 1700 may further include (and/or be in communication with) one or more non-transitory storage devices 1725, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1700 may also include a communications subsystem 1730, which may comprise wireless communication technologies managed and controlled by a wireless communication interface 1733, as well as wired technologies (such as Ethernet, coaxial communications, universal serial bus (USB), and the like). The wireless communication interface 1733 may comprise one or more wireless transceivers may send and receive wireless signals 1755 (e.g., signals according to 5G NR or LTE) via wireless antenna(s) 1750. Thus the communications subsystem 1730 may comprise a modem, a network card (wireless or wired), an infrared communication device, a wireless communication device, and/or a chipset, and/or the like, which may enable the computer system 1700 to communicate on any or all of the communication networks described herein to any device on the respective network, including a User Equipment (UE), base stations and/or other TRPs, and/or any other electronic devices described herein. Hence, the communications subsystem 1730 may be used to receive and send data as described in the embodiments herein.

In many embodiments, the computer system 1700 will further comprise a working memory 1735, which may comprise a RAM or ROM device, as described above. Software elements, shown as being located within the working memory 1735, may comprise an operating system 1740, device drivers, executable libraries, and/or other code, such as one or more applications 1745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1725 described above. In some cases, the storage medium might be incorporated within a computer system, such as computer system 1700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1700 and/or might take the form of source and/or installable code, which, upon compilation and/or installation on the computer system 1700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of detecting an attack on reference signals used for positioning of a user equipment (UE) in a wireless communication network, the method performed by a receiving device and comprising: receiving, at the receiving device, at least a portion of a reference signal resource transmitted by a transmitting device; determining a measured signal characteristic from: an Orthogonal Frequency Division Multiplexing (OFDM) symbol of the at least a portion of the reference signal resource, a resource repetition of the at least a portion of the reference signal resource, or a combination thereof; comparing the measured signal characteristic with a comparison signal characteristic, wherein the comparison signal characteristic comprises: a calculated angle based on estimated locations of the transmitting device and receiving device, or a corresponding measured signal characteristic of one or more radio frequency (RF) signals transmitted by the transmitting device; and responsive to determining greater than a threshold difference between the measured signal characteristic and the comparison signal characteristic, sending information indicative of an attack on the reference signal resource to another device.

Clause 2. The method of clause 1, wherein the one or more RF signals comprise one or more additional OFDM symbols of the reference signal resource, one or more additional resource repetitions of the reference signal resource, or a combination thereof.

Clause 3. The method of clause 1, wherein the one or more RF signals comprise a separately transmitted signal Quasi-Co-Located (QCLed) with the reference signal resource.

Clause 4. The method of clause 3, wherein the separately transmitted signal comprises: a Tracking Reference Signal (TRS), a Channel State Information Reference Signal (CSI-RS), or a Demodulation Reference Signal (DMRS).

Clause 5. The method of any of clauses 1-4, wherein the measured signal characteristic and the corresponding measured signal characteristic each comprise: a peak location of a Channel Energy Response (CER), or a power delay profile of the CER, or a combination thereof.

Clause 6. The method of any of clauses 1-4, wherein the measured signal characteristic and the corresponding measured signal characteristic each comprise: an Angle of Arrival (AoA), or an Angle of Departure (AoD), or a combination thereof.

Clause 7. The method of any of clauses 1-4, wherein the measured signal characteristic and the corresponding measured signal characteristic each comprise a Reference Signal Received Power (RSRP).

Clause 8. The method of any of clauses 1-7, wherein the transmitting device comprises a TRP of the wireless communication network and the reference signal resource comprises a Positioning Reference Signal (PRS) resource.

Clause 9. The method of any of clauses 1-7, wherein the transmitting device comprises the UE and the reference signal resource comprises a Sounding Reference Signal (SRS) resource.

Clause 10. The method of any of clauses 1-9, wherein the receiving device comprises the UE or a Transmission and Reception Point (TRP) of the wireless communication network.

Clause 11. The method of any of clauses 1-10, wherein the information indicative of an attack on the reference signal resource comprises: a resource ID, a symbol index, a time stamp, a frequency, an indication of the measured signal characteristic, a position of the UE, or a combination thereof.

Clause 12. The method of any of clauses 1-11, wherein sending information indicative of an attack on the reference signal resource to another device comprises sending the information to a location server via: an Uplink Control Information (UCI) message, a Media Access Control-Control Element (MAC-CE) message, an LTE Positioning Protocol (LPP) message, or a Radio Resource Control (RRC) message, or a combination thereof.

Clause 13. The method of any of clauses 1-12, wherein sending information indicative of an attack on the reference signal resource to another device comprises sending the information wirelessly to the UE, one or more additional UEs, or both.

Clause 14. A receiving device for detecting an attack on reference signals used for positioning of a user equipment (UE) in a wireless communication network, the receiving device comprising: a transceiver; a memory; and one or more processing units communicatively coupled with the transceiver and the memory, the one or more processing units configured to: receive, via the transceiver, at least a portion of a reference signal resource transmitted by a transmitting device; determine a measured signal characteristic from: an Orthogonal Frequency Division Multiplexing (OFDM) symbol of the at least a portion of the reference signal resource, a resource repetition of the at least a portion of the reference signal resource, or a combination thereof; compare the measured signal characteristic with a comparison signal characteristic, wherein the comparison signal characteristic comprises: a calculated angle based on estimated locations of the transmitting device and receiving device, or a corresponding measured signal characteristic of one or more radio frequency (RF) signals transmitted by the transmitting device; and responsive to determining greater than a threshold difference between the measured signal characteristic and the comparison signal characteristic, send information indicative of an attack on the reference signal resource to another device via the transceiver.

Clause 15. The receiving device of clause 14, wherein the one or more processing units are configured to measure the one or more RF signals to obtain the corresponding measured signal characteristic, wherein the one or more RF signals comprise one or more additional OFDM symbols of the reference signal resource, one or more additional resource repetitions of the reference signal resource, or a combination thereof.

Clause 16. The receiving device of clause 14, wherein the one or more processing units are configured to measure the one or more RF signals to obtain the corresponding measured signal characteristic, wherein the one or more RF signals comprise a separately transmitted signal Quasi-Co-Located (QCLed) with the reference signal resource.

Clause 17. The receiving device of clause 16 wherein, to measure the separately transmitted signal, the one or more processing units are configured to measure, a Tracking Reference Signal (TRS), a Channel State Information Reference Signal (CSI-RS), or a Demodulation Reference Signal (DMRS).

Clause 18. The receiving device of any of clauses 14-17, wherein the measured signal characteristic and the corresponding measured signal characteristic each comprise: a peak location of a Channel Energy Response (CER), or a power delay profile of the CER, or a combination thereof.

Clause 19. The receiving device of any of clauses 14-17, wherein the measured signal characteristic and the corresponding measured signal characteristic each comprise: an Angle of Arrival (AoA), or an Angle of Departure (AoD), or a combination thereof.

Clause 20. The receiving device of any of clauses 14-17, wherein the measured signal characteristic and the corresponding measured signal characteristic each comprise a Reference Signal Received Power (RSRP).

Clause 21. The receiving device of any of clauses 14-20, wherein the transmitting device comprises a TRP of the wireless communication network and the reference signal resource comprises a Positioning Reference Signal (PRS) resource.

Clause 22. The receiving device of any of clauses 14-20, wherein the transmitting device comprises the UE and the reference signal resource comprises a Sounding Reference Signal (SRS) resource.

Clause 23. The receiving device of any of clauses 14-22, wherein the receiving device comprises the UE or a Transmission and Reception Point (TRP) of the wireless communication network.

Clause 24. The receiving device of any of clauses 14-23, wherein the one or more processing units are configured to include, in the information indicative of an attack on the reference signal resource: a resource ID, a symbol index, a time stamp, a frequency, an indication of the measured signal characteristic, a position of the UE, or a combination thereof.

Clause 25. The receiving device of any of clauses 14-24 wherein, to send the information indicative of an attack on the reference signal resource to another device, the one or more processing units are configured to send the information to a location server via, an Uplink Control Information (UCI) message, a Media Access Control-Control Element (MAC-CE) message, an LTE Positioning Protocol (LPP) message, or a Radio Resource Control (RRC) message, or a combination thereof.

Clause 26. The receiving device of any of clauses 14-25 wherein, to send the information indicative of an attack on the reference signal resource to another device, the one or more processing units are configured to send the information wirelessly to the UE, one or more additional UEs, or both.

Clause 27. A device for detecting an attack on reference signals used for positioning of a user equipment (UE) in a wireless communication network, the device comprising: means for receiving at least a portion of a reference signal resource transmitted by a transmitting device; means for determining a measured signal characteristic from: an Orthogonal Frequency Division Multiplexing (OFDM) symbol of the at least a portion of the reference signal resource, a resource repetition of the at least a portion of the reference signal resource, or a combination thereof; means for comparing the measured signal characteristic with a comparison signal characteristic, wherein the comparison signal characteristic comprises: a calculated angle based on estimated locations of the transmitting device and a receiving device, or a corresponding measured signal characteristic of one or more radio frequency (RF) signals transmitted by the transmitting device; and means for sending, responsive to determining greater than a threshold difference between the measured signal characteristic and the comparison signal characteristic, information indicative of an attack on the reference signal resource to another device.

Clause 28. The device of clause 27, wherein the one or more RF signals comprise one or more additional OFDM symbols of the reference signal resource, one or more additional resource repetitions of the reference signal resource, or a combination thereof.

Clause 29. The device of any of clauses 27-28, wherein the measured signal characteristic and the corresponding measured signal characteristic each comprise: a peak location of a Channel Energy Response (CER), or a power delay profile of the CER, or a combination thereof.

Clause 30. A non-transitory computer-readable medium storing instructions for detecting an attack on reference signals used for positioning of a user equipment (UE) in a wireless communication network, the instructions comprising code for: receiving, at a receiving device, at least a portion of a reference signal resource transmitted by a transmitting device; determining a measured signal characteristic from: an Orthogonal Frequency Division Multiplexing (OFDM) symbol of the at least a portion of the reference signal resource, a resource repetition of the at least a portion of the reference signal resource, or a combination thereof; comparing the measured signal characteristic with a comparison signal characteristic, wherein the comparison signal characteristic comprises: a calculated angle based on estimated locations of the transmitting device and receiving device, or a corresponding measured signal characteristic of one or more radio frequency (RF) signals transmitted by the transmitting device; and responsive to determining greater than a threshold difference between the measured signal characteristic and the comparison signal characteristic, sending information indicative of an attack on the reference signal resource to another device.

What is claimed is:

1. A method of detecting an attack on reference signals used for positioning of a user equipment (UE) in a wireless communication network, the method performed by a receiving device and comprising:

receiving, at the receiving device, at least a portion of a reference signal resource transmitted by a transmitting device;

determining a measured signal characteristic from:

an Orthogonal Frequency Division Multiplexing (OFDM) symbol of the at least a portion of the reference signal resource, a resource repetition of the at least a portion of the reference signal resource, or a combination thereof;

comparing the measured signal characteristic with a comparison signal characteristic to determine a difference, wherein the comparison signal characteristic comprises:

a calculated angle based on estimated locations of the transmitting device and receiving device, or a corresponding measured signal characteristic of one or more radio frequency (RF) signals transmitted by the transmitting device; and responsive to the determined difference being greater than a threshold, sending, to another device, information indicative of an attack on the reference signal resource.

2. The method of claim 1, wherein the one or more RF signals comprise one or more additional OFDM symbols of the reference signal resource, one or more additional resource repetitions of the reference signal resource, or a combination thereof.

3. The method of claim 1, wherein the one or more RF signals comprise a separately transmitted signal Quasi-Co-Located (QCLed) with the reference signal resource.

4. The method of claim 3, wherein the separately transmitted signal comprises:

a Tracking Reference Signal (TRS), a Channel State Information Reference Signal (CSI-RS), or a Demodulation Reference Signal (DMRS).

5. The method of claim 1, wherein the measured signal characteristic and the corresponding measured signal characteristic each comprise:

a peak location of a Channel Energy Response (CER), or a power delay profile of the CER, or a combination thereof.

6. The method of claim 1, wherein the measured signal characteristic and the corresponding measured signal characteristic each comprise:

an Angle of Arrival (AoA), or an Angle of Departure (AoD), or a combination thereof.

7. The method of claim 1, wherein the measured signal characteristic and the corresponding measured signal characteristic each comprise a Reference Signal Received Power (RSRP).

8. The method of claim 1, wherein the transmitting device comprises a TRP of the wireless communication network and the reference signal resource comprises a Positioning Reference Signal (PRS) resource.

9. The method of claim 1, wherein the transmitting device comprises the UE and the reference signal resource comprises a Sounding Reference Signal (SRS) resource.

10. The method of claim 1, wherein the receiving device comprises the UE or a Transmission and Reception Point (TRP) of the wireless communication network.

11. The method of claim 1, wherein the information indicative of an attack on the reference signal resource comprises:

a resource ID, a symbol index, a time stamp, a frequency, an indication of the measured signal characteristic, a position of the UE, or a combination thereof.

12. The method of claim 1, wherein sending information indicative of an attack on the reference signal resource to another device comprises sending the information to a location server via:

an Uplink Control Information (UCI) message, a Media Access Control—Control Element (MAC-CE) message, an LTE Positioning Protocol (LPP) message, or a Radio Resource Control (RRC) message, or a combination thereof.

13. The method of claim 1, wherein sending information indicative of an attack on the reference signal resource to another device comprises sending the information wirelessly to the UE, one or more additional UEs, or both.

14. A receiving device for detecting an attack on reference signals used for positioning of a user equipment (UE) in a wireless communication network, the receiving device comprising:

a transceiver;

a memory; and one or more processing units communicatively coupled with the transceiver and the memory, the one or more processing units configured to:

receive, via the transceiver, at least a portion of a reference signal resource transmitted by a transmitting device;

determine a measured signal characteristic from:

an Orthogonal Frequency Division Multiplexing (OFDM) symbol of the at least a portion of the reference signal resource, a resource repetition of the at least a portion of the reference signal resource, or a combination thereof;

compare the measured signal characteristic with a comparison signal characteristic to determine a difference, wherein the comparison signal characteristic comprises:

a calculated angle based on estimated locations of the transmitting device and receiving device, or a corresponding measured signal characteristic of one or more radio frequency (RF) signals transmitted by the transmitting device; and responsive to the determined difference being greater than a threshold, send, to another device via the transceiver, information indicative of an attack on the reference signal resource.

15. The receiving device of claim 14, wherein the one or more processing units are configured to measure the one or more RF signals to obtain the corresponding measured signal characteristic, wherein the one or more RF signals comprise one or more additional OFDM symbols of the reference signal resource, one or more additional resource repetitions of the reference signal resource, or a combination thereof.

16. The receiving device of claim 14, wherein the one or more processing units are configured to measure the one or more RF signals to obtain the corresponding measured signal characteristic, wherein the one or more RF signals comprise a separately transmitted signal Quasi-Co-Located (QCLed) with the reference signal resource.

17. The receiving device of claim 16, wherein, to measure the separately transmitted signal, the one or more processing units are configured to measure:

a Tracking Reference Signal (TRS), a Channel State Information Reference Signal (CSI-RS), or a Demodulation Reference Signal (DMRS).

18. The receiving device of claim 14, wherein the measured signal characteristic and the corresponding measured signal characteristic each comprise:

a peak location of a Channel Energy Response (CER), or a power delay profile of the CER, or a combination thereof.

19. The receiving device of claim 14, wherein the measured signal characteristic and the corresponding measured signal characteristic each comprise:

an Angle of Arrival (AoA), or an Angle of Departure (AoD), or a combination thereof.

20. The receiving device of claim 14, wherein the measured signal characteristic and the corresponding measured signal characteristic each comprise a Reference Signal Received Power (RSRP).

21. The receiving device of claim 14, wherein the transmitting device comprises a TRP of the wireless communication network and the reference signal resource comprises a Positioning Reference Signal (PRS) resource.

22. The receiving device of claim 14, wherein the transmitting device comprises the UE and the reference signal resource comprises a Sounding Reference Signal (SRS) resource.

23. The receiving device of claim 14, wherein the receiving device comprises the UE or a Transmission and Reception Point (TRP) of the wireless communication network.

24. The receiving device of claim 14, wherein the one or more processing units are configured to include, in the information indicative of an attack on the reference signal resource:

a resource ID, a symbol index, a time stamp, a frequency, an indication of the measured signal characteristic, a position of the UE, or a combination thereof.

25. The receiving device of claim 14, wherein, to send the information indicative of an attack on the reference signal resource to another device, the one or more processing units are configured to send the information to a location server via:

an Uplink Control Information (UCI) message, a Media Access Control-Control Element (MAC-CE) message, an LTE Positioning Protocol (LPP) message, or a Radio Resource Control (RRC) message, or a combination thereof.

26. The receiving device of claim 14, wherein, to send the information indicative of an attack on the reference signal resource to another device, the one or more processing units are configured to send the information wirelessly to the UE, one or more additional UEs, or both.

27. A device for detecting an attack on reference signals used for positioning of a user equipment (UE) in a wireless communication network, the device comprising:

means for receiving at least a portion of a reference signal resource transmitted by a transmitting device;

means for determining a measured signal characteristic from:

an Orthogonal Frequency Division Multiplexing (OFDM) symbol of the at least a portion of the reference signal resource, a resource repetition of the at least a portion of the reference signal resource, or a combination thereof;

means for comparing the measured signal characteristic with a comparison signal characteristic to determine a difference, wherein the comparison signal characteristic comprises:

a calculated angle based on estimated locations of the transmitting device and a receiving device, or a corresponding measured signal characteristic of one or more radio frequency (RF) signals transmitted by the transmitting device; and means for sending, to another device in response to the determined difference being greater than a threshold, information indicative of an attack on the reference signal resource.

28. The device of claim 27, wherein the one or more RF signals comprise one or more additional OFDM symbols of the reference signal resource, one or more additional resource repetitions of the reference signal resource, or a combination thereof.

29. The device of claim 27, wherein the measured signal characteristic and the corresponding measured signal characteristic each comprise:

a peak location of a Channel Energy Response (CER), or a power delay profile of the CER, or a combination thereof.

30. A non-transitory computer-readable medium storing instructions for detecting an attack on reference signals used for positioning of a user equipment (UE) in a wireless communication network, the instructions comprising code for:

receiving, at a receiving device, at least a portion of a reference signal resource transmitted by a transmitting device;

determining a measured signal characteristic from:

an Orthogonal Frequency Division Multiplexing (OFDM) symbol of the at least a portion of the reference signal resource, a resource repetition of the at least a portion of the reference signal resource, or a combination thereof;

comparing the measured signal characteristic with a comparison signal characteristic to determine a difference, wherein the comparison signal characteristic comprises:

a calculated angle based on estimated locations of the transmitting device and receiving device, or a corresponding measured signal characteristic of one or more radio frequency (RF) signals transmitted by the transmitting device; and responsive to the determined difference being greater than a threshold, sending, to another device, information indicative of an attack on the reference signal resource.

* * * * *